US012811493B2

(12) United States Patent
Kishiro

(10) Patent No.: US 12,811,493 B2
(45) Date of Patent: Nov. 24, 2026

(54) POWER SUPPLY CIRCUIT AND DEVICE

(71) Applicant: FUJI ELECTRIC CO., LTD., Kawasaki (JP)

(72) Inventor: Masami Kishiro, Hino-city (JP)

(73) Assignee: FUJI ELECTRIC CO. LTD., Kawasaki (JP)

( * ) Notice: Subject to any disclaimer, the term of this patent is extended or adjusted under 35 U.S.C. 154(b) by 173 days.

(21) Appl. No.: 18/751,670

(22) Filed: Jun. 24, 2024

(65) Prior Publication Data

US 2024/0348158 A1 Oct. 17, 2024

Related U.S. Application Data

(63) Continuation of application No. PCT/JP2022/047333, filed on Dec. 22, 2022.

(51) Int. Cl.
*H02M 3/158* (2006.01)
*H02M 1/44* (2007.01)

(52) U.S. Cl.
CPC ............. *H02M 1/44* (2013.01); *H02M 3/158* (2013.01)

(58) Field of Classification Search
CPC ........ H02M 1/44; H02M 3/156; H02M 3/158; H02M 3/1588
See application file for complete search history.

(56) References Cited

U.S. PATENT DOCUMENTS 4,260,908 A * 4/1981 Mings ................ H03K 17/7955 327/108
6,509,721 B1 1/2003 Liebler
10,135,342 B1 11/2018 Yu

FOREIGN PATENT DOCUMENTS

CN 206585464 U 10/2017
JP 2016-206127 A 12/2016

OTHER PUBLICATIONS

Extended European Search Report dated Jan. 29, 2025 for European Application No. 22969211.6.

* cited by examiner

*Primary Examiner* — Gary L Laxton

(57) ABSTRACT

A power supply circuit includes: an input terminal that receives an input voltage; an inductor; a switching circuit electrically connected to the inductor and configured to switch between a storing period for storing energy in the inductor and a discharge period for discharging the energy stored in the inductor; an output terminal that receives a current from the inductor in the storing and discharging periods; a transistor electrically connected to the inductor and serving as a portion of a path of a current flowing to the inductor in the storing and discharging periods. The output terminal outputs a voltage based on the storing period, the discharging period, and the input voltage. The transistor stops a switching operation that is used to switch between the storing and discharging periods, by preventing the current flowing to the inductor, in a signal processing period in which a signal processing circuit is processing a signal.

7 Claims, 11 Drawing Sheets

POWER SUPPLY CIRCUIT AND DEVICE

CROSS REFERENCE TO RELATED APPLICATION

This application is a Continuation application of PCT Application No. PCT/JP2022/047333 filed on Dec. 22, 2022, the entire contents of which are incorporated herein by reference.

BACKGROUND

Field of the Invention

The present invention relates to power supply circuits and to devices.

Switching regulators are known as power supply circuits. Patent Literature 1 (Japanese Patent Application, Laid-Open Publication No. 2016-206127) discloses an ultrasonic flowmeter using switching regulators as a power supply, for example. The switching regulator outputs a predetermined voltage, for example, by a switching operation for switching between a period for storing energy in an inductor and a period for discharging the energy stored in the inductor.

If the switching regulator (power supply circuit) is disposed near a circuit that processes a weak signal, such as an output signal from a sensor, there is a risk that switching noise generated by the switching operation may affect the processing of the weak signal. For example, the switching noise may cause generation of an error in the processing result of the weak signal output from the sensor.

SUMMARY

In view of the above circumstances, it is an object of an aspect of the present invention to prevent generation of switching noise in a period in which a predetermined signal, such as a weak signal, is processed.

A power supply circuit according to a preferred aspect of the present invention includes: an input terminal that receives an input voltage; an inductor including a first terminal and a second terminal; a switching circuit electrically connected to the first terminal and configured to switch between a first period for storing energy in the inductor and a second period for discharging the energy stored in the inductor; an output terminal that receives a current from the inductor at least in the second period from among the first period and the second period; and a first element electrically connected to the second terminal and serving as a portion of a path of a current flowing to the inductor in the first period and the second period. The output terminal outputs a voltage based on the first period, the second period, and the input voltage. The first element stops a switching operation that is used to switch between the first period and the second period, by preventing the current flowing to the inductor, in a predetermined period in which a predetermined circuit is processing a predetermined signal.

A device according to a preferred aspect of the present invention includes: the power supply circuit; a sensor; and the predetermined circuit. The predetermined circuit processes an output signal of the sensor as the predetermined signal.

MODES FOR CARRYING OUT THE INVENTION

Figure 1:
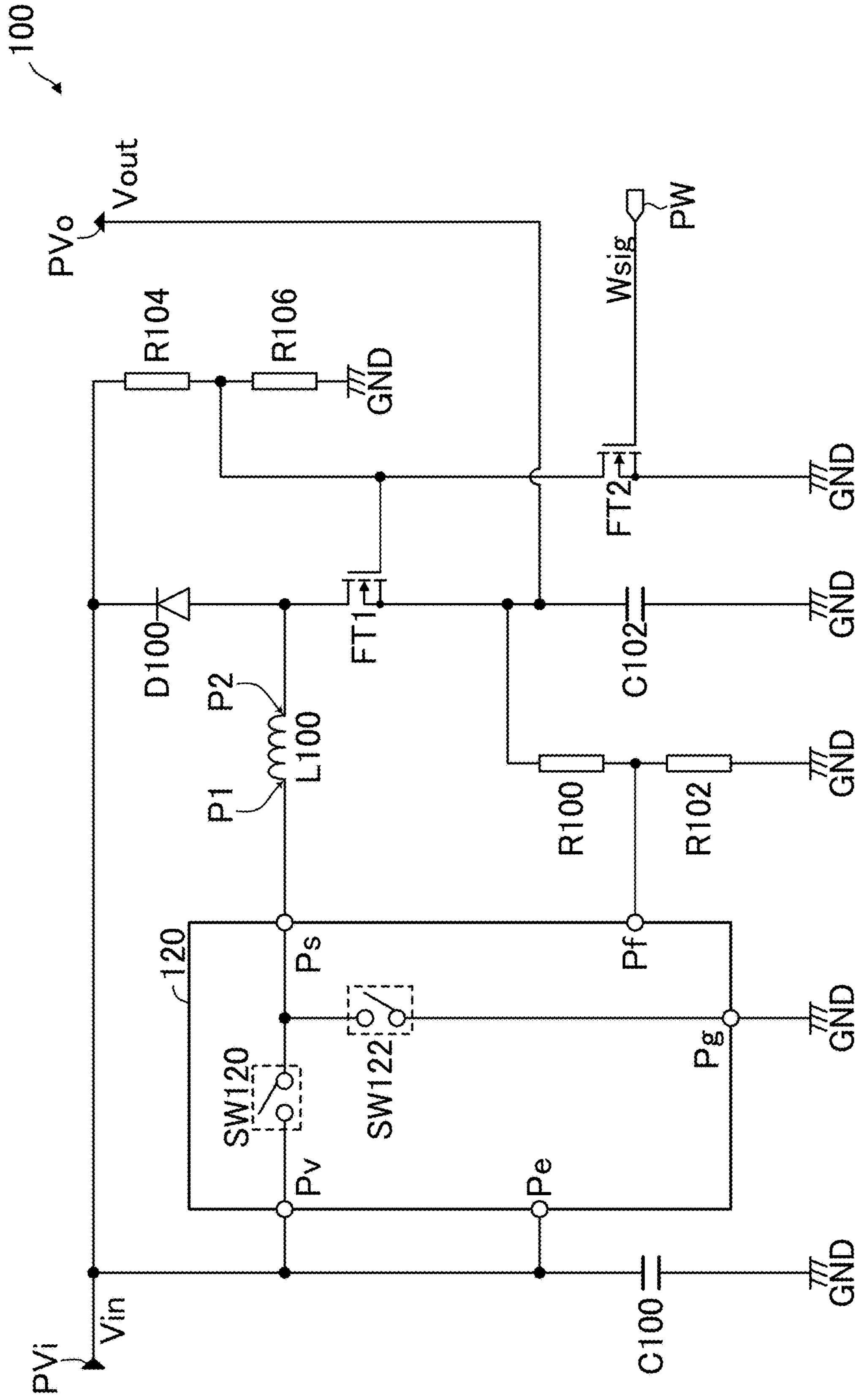
FIG. 1 is an explanatory diagram for an example of a power supply circuit according to a first embodiment.

Embodiments for implementing the present invention are explained below with reference to drawings. Dimensions and scales of respective parts in the drawings differ from those of actual products as appropriate. Since the embodiments described below are preferred specific examples of the present invention, technically preferred various limitations are added thereto. However, the scope of the present invention is not limited to these embodiments unless otherwise stated in the following explanations that the present invention is specifically limited.

A: EMBODIMENTS

Description will be given of embodiments of the present invention. First, an example overview of a power supply circuit 100 according to an embodiment is described with reference to FIG. 1.

A: First Embodiment

FIG. 1 is an explanatory diagram for an example of the power supply circuit 100 according to a first embodiment.

Figure 2:
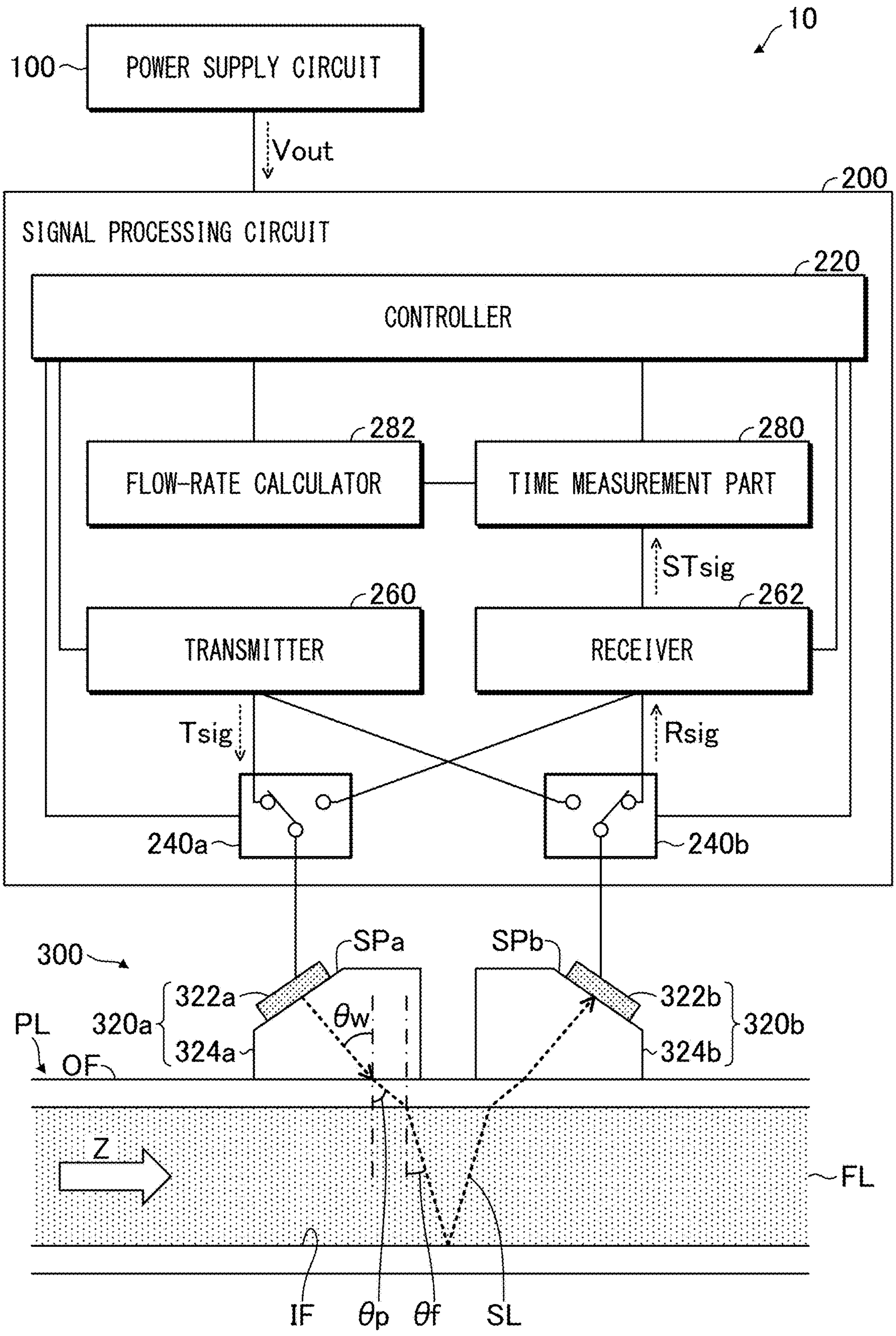
FIG. 2 is an explanatory diagram for an example of a device including the power supply circuit illustrated in FIG. 1.

The power supply circuit 100 generates a power supply voltage to be supplied to a circuit that processes a weak signal, such as an output signal of a sensor 300, as illustrated in FIG. 2, described later. The power supply circuit 100 according to this embodiment is a step-down switching power supply that outputs a voltage Vout that is less than an input voltage Vin. For example, the power supply circuit 100 generates the voltage Vout by a switching operation that is used to switch between a storing period for storing energy in an inductor L100 and a discharge period for discharging the energy stored in the inductor L100. Accordingly, the voltage Vout based on the storing period, the discharge period, and the input voltage Vin is output from an output terminal PVo. The storing period is an example of a "first period," and the discharge period is an example of a "second period." In this embodiment, it is envisaged that the power supply circuit 100 is a power supply circuit of a synchronous rectification system.

For example, the power supply circuit 100 includes an input terminal PVi to which the input voltage Vin is supplied, the inductor L100, a switching circuit 120, the output terminal PVo outputting the voltage Vout, and transistors FT1 and FT2. The transistor FT1 is an example of a "first element."

Each of the transistors FT1 and FT2 is, for example, an N-channel field effect transistor. For example, the power supply circuit 100 further includes a control terminal PW to which a control signal Wsig is supplied. The control signal Wsig is used to control a voltage supplied to the gate of the transistor FT2. The power supply circuit 100 further includes capacitors C100 and C102, resistors R100, R102, R104, and R106, and a diode D100.

For example, the switching circuit 120 switches between the storing period for storing energy in the inductor L100 and the discharge period for discharging the energy stored in the inductor L100. For example, the switching circuit 120 includes terminals Pv, Ps, Pf, Pg, and Pe and switches SW120 and SW122, such as field effect transistors. For the sake of clarity, only some of the components included in the switching circuit 120 are illustrated in FIG. 1. Illustrations of the rest of the components are omitted.

The terminal Pv of the switching circuit 120 is electrically connected to the input terminal PVi. Accordingly, the input voltage Vin is supplied to the switching circuit 120. The terminal Ps is electrically connected to a terminal P1 of the inductor L100, and the terminal Pg is electrically connected to a ground terminal GND to which a ground voltage is supplied. The terminal P1 of the inductor L100 is an example of a "first terminal," and a terminal P2 of the inductor L100 is an example of a "second terminal."

For example, the switch SW120 is connected between the terminal Pv and the terminal Ps. The switch SW120 switches between (i) an on-state in which the terminal Pv and the terminal Ps are conductive, and (ii) an off-state in which they are not conductive. The switch SW122 is connected between the terminal Ps and the terminal Pg. The switch SW122 switches between (i) an on-state in which the terminal Ps and the terminal Pg are conductive and (ii) an off-state in which they are not conductive. For example, when the switch SW120 is in an on-state, the terminal Pv and the terminal Ps is conductive. When the switch SW120 is in an off-state, the terminal Pv and the terminal Ps is nonconductive. Similarly, when the switch SW122 is in an on-state, the terminal Ps and the terminal Pg become conductive. When the switch SW122 is in an off-state, the terminal Ps and the terminal Pg is nonconductive. In this embodiment, the switches SW120 and SW122 are controlled not to be in an on-state at the same time.

For example, in the storing period, the switch SW120 is in an on-state, and the switch SW122 is in an off-state. In the discharge period, the switch SW120 is in an off-state, and the switch SW122 is in an on-state. That is, the switching circuit 120 brings the input terminal PVi and the terminal P1 of the inductor L100 into a conductive state in the storing period, and brings them into a nonconductive state in the discharge period.

In this embodiment, the state of the transistor FT1 described later is controlled independently of control of the states of the switches SW120 and SW122, whereby it is possible to stop the switching operation, which is used to switch between the storing period and the discharge period. For this reason, a period in which the switch SW120 is in an on-state and in which the switch SW122 is in an off-state may be called an "on-period" when attention is focused on the state of the switch SW120. Similarly, a period in which the switch SW120 is in an off-state and in which the switch SW122 is in an on-state may be called an "off-period" when attention is focused on the state of the switch SW120. The switching circuit 120 performs a switching operation that is used to switch between the on-period and the off-period so as to make the voltage Vout equal to a predetermined voltage value.

The terminal Pf of the switching circuit 120 receives a feedback signal for making the voltage Vout equal to the predetermined voltage value. In the example illustrated in FIG. 1, the resistors R100 and R102 are connected in series between the output terminal PVo and the ground terminal GND. The feedback signal is obtained by subjecting the voltage Vout to resistive voltage division using the resistors R100 and R102. The voltage Vout indicates a voltage of the capacitor C102 connected between the output terminal PVo and the ground terminal GND. The resistors R100 and R102 connected in series are connected to the capacitor C102 in parallel.

For example, the switching circuit 120 controls, based on the feedback signal supplied to the terminal Pf, the switching operation, which is used to switch between the on-period and the off-period. As a method for controlling the switching operation, which is used to switch between the on-period and the off-period, a known control method, such as PWM (Pulse Width Modulation) and PFM (Pulse Frequency Modulation) can be employed.

The terminal Pe of the switching circuit 120 receives an enable signal for selecting whether the switching circuit 120 is operated. For example, when a low-level enable signal is supplied to the terminal Pe, the operation of the switching circuit 120 is stopped, and both the switches SW120 and SW122 are maintained in an off-state. In the example illustrated in FIG. 1, the input voltage Vin is supplied to the terminal Pe as a high-level enable signal for operating the switching circuit 120. Furthermore, in the example illustrated in FIG. 1, the capacitor C100 for preventing a fluctuation in the input voltage Vin is connected between the input terminal PVi and the ground terminal GND.

For example, the transistor FT1 is connected between the terminal P2 of the inductor L100 and the output terminal PVo. The transistor FT1 switches between (i) an on-state in which the terminal P2 of the inductor L100 and the output terminal PVo are conductive and (ii) an off-state in which they are not conductive. For example, when the transistor FT1 is in an on-state, the terminal P2 of the inductor L100 and the output terminal PVo become conductive. When the transistor FT1 is in an off-state, the terminal P2 of the inductor L100 and the output terminal PVo become nonconductive.

As a result, when the transistor FT1 is in an on-state, in the on-period of the switch SW120, the ground terminal GND and the terminal P1 of the inductor L100 become nonconductive. In addition, the input terminal PVi and the output terminal PVo become conductive via the inductor L100 and the transistor FT1. A current is supplied to the output terminal PVo from the input terminal PVi via the switch SW120, the inductor L100, and the transistor FT1. Due to the current flow from the input terminal PVi to the inductor L100, energy is stored in the inductor L100. In addition, since the input terminal PVi receiving the input voltage Vin and the output terminal PVo become conductive, the capacitor C102 connected between the output terminal PVo and the ground terminal GND is charged.

When the transistor FT1 is in an on-state, in the off-period of the switch SW120, the input terminal PVi and the terminal P1 of the inductor L100 become nonconductive. In addition, the ground terminal GND and the output terminal PVo become conductive via the inductor L100 and the transistor FT1. When the switch SW120 is switched from an on-state to an off-state, the inductor L100 acts so as to continue to cause a current to flow to the output terminal PVo and thus discharges the energy stored in the on-period. Accordingly, a current is supplied to the output terminal PVo from the ground terminal GND via the switch SW122, the inductor L100, and the transistor FT1. Thus, in this embodiment, a current is supplied from the inductor L100 to the output terminal PVo in both the storing period and the discharge period.

When the transistor FT1 is in an off-state, the terminal P2 of the inductor L100 and the output terminal PVo become nonconductive, and thus, a current flowing to the inductor L100 is prevented. For example, by placing the transistor FT1 in an off-state, the current flow from the inductor L100 to the output terminal PVo is cut off, so that current supply from the inductor L100 to the output terminal PVo is stopped. In this case, a current is supplied to the output terminal PVo, from the capacitor C102 connected between the output terminal PVo and the ground terminal GND.

In this embodiment, the power supply circuit 100 includes the diode D100. The diode D100 has the anode electrically connected to the terminal P2 of the inductor L100 and the cathode electrically connected to the input terminal PVi. The diode D100 acts as a circuit that returns as a current, the energy stored in the inductor L100 to the input terminal PVi when the current flowing to the inductor L100 is prevented by switching of the transistor FT1 from an on-state to an off-state. By the end of discharge of the energy stored in the inductor L100, the switching operation, which is used to switch between the storing period and the discharge period, is stopped. For example, even when the switch SW120 is in an on-state, no current flows to the inductor L100. This is because the transistor FT1 is in an off-state and a voltage greater than a forward voltage is not applied to the diode D100. As a result, the switching operation, which is used to switch between the storing period and the discharge period, is stopped. Thus, the diode D100 serves as a portion of a path of the current flowing to the inductor L100 until discharge of the energy stored in the inductor L100 ends, when the switching operation is stopped.

In a configuration in which the diode D100 is omitted, the energy stored in the inductor L100 is not discharged as a current when the transistor FT1 is switched from an on-state to an off-state. As a result, the configuration in which the diode D100 is omitted has a risk that, when the transistor FT1 is switched from an on-state to an off-state, a high voltage is generated in the inductor L100 and may damage an element such as the transistor FT1. In this embodiment, even when the transistor FT1 is switched from an on-state to an off-state, the energy stored in the inductor L100 is discharged as a current to the input terminal PVi due to the diode D100. In this embodiment, it is possible to prevent the element such as the transistor FT1 from being damaged.

Thus, the transistor FT1 is electrically connected to the terminal P2 of the inductor L100 and serves as a portion of a path of the current flowing to the inductor L100 in the storing period and the discharge period. By preventing the current flowing to the inductor L100, the transistor FT1 stops the switching operation, which is used to switch between the storing period and the discharge period. Accordingly, in this embodiment, it is possible to stop the switching operation, which is used to switch between the storing period and the discharge period, by placing the transistor FT1 in an off-state.

For example, in this embodiment, a predetermined circuit disposed near the power supply circuit 100 is processing a predetermined signal in a predetermined period. In the predetermined period, the transistor FT1 is in an off-state, thereby stopping the switching operation, which is used to switch between the storing period and the discharge period. In this embodiment, it is envisaged that the predetermined circuit receives a power supply voltage from the power supply circuit 100. In this embodiment, a circuit is provided which operates by using the voltage Vout output from the output terminal PVo as its power supply voltage. The circuit is processing a predetermined signal in a predetermined period. In the predetermined period, the transistor FT1 is in an off-state, thereby stopping the switching operation, which is used to switch between the storing period and the discharge period. Accordingly, in this embodiment, switching noise caused by the switching operation is prevented from being generated in the predetermined period. As a result, in this embodiment, it is possible to prevent generation of an error caused by the switching noise in the processing result of the predetermined signal. In this embodiment, although it envisaged that the power supply voltage of the predetermined circuit is supplied from the power supply circuit 100, it is also possible for the power supply voltage of the predetermined circuit to not be supplied from the power supply circuit 100. That is, the predetermined circuit may receive the power supply voltage from a power supply circuit other than the power supply circuit 100. In this case, a predetermined circuit is provided which operates by using the power supply voltage supplied from the power supply circuit other than the power supply circuit 100. The predetermined circuit is processing a predetermined signal in a predetermined period. In the predetermined period, the transistor FT1 is in an off-state thereby stopping the switching operation, which is used to switch between the storing period and the discharge period.

Switching ON and OFF of the transistor FT1 is controlled by, for example, the control signal Wsig supplied to the control terminal PW.

For example, the control terminal PW is connected to the gate of the transistor FT2. The gate of the transistor FT2 may be connected to the ground terminal GND via a pull-down resistor so as to be maintained at a low level for a high-impedance control terminal PW. The source of the transistor FT2 is connected to the ground terminal GND. The drain of the transistor FT2 is connected to the gate of the transistor FT1.

When a high-level control signal Wsig is supplied to the control terminal PW, the transistor FT2 is in an on-state, so that the gate of the transistor FT1 and the ground terminal GND become conductive. That is, when the high-level control signal Wsig is supplied to the control terminal PW, the transistor FT1 is in an off-state. Alternatively, when a low-level control signal Wsig is supplied to the control terminal PW, the transistor FT2 is in an off-state, so that the gate of the transistor FT1 and the ground terminal GND become nonconductive.

The gate of the transistor FT1 is connected to the resistors R104 and R106 connected in series between the input terminal PVi and the ground terminal GND, in addition to the drain of the transistor FT2. Specifically, the gate of the transistor FT1 is connected to a connection node between the resistor R104 and the resistor R106. Accordingly, for example, in a period for a low-level control signal Wsig, that is, a period in which the transistor FT2 is in an off-state, the gate of the transistor FT1 is maintained at a voltage obtained by subjecting the input voltage Vin to resistive voltage division using the resistors R104 and R106. In this embodiment, the power supply circuit 100 is designed in such a manner that the transistor FT1 is in an on-state when the voltage obtained by subjecting the input voltage Vin to resistive voltage division using the resistors R104 and R106 is supplied to the gate of the transistor FT1.

For example, when "Vg1" represents a gate voltage of the transistor FT1, the voltage Vg1 in a period in which the transistor FT2 is in an off-state is defined by Expression (1) by using the input voltage Vin. "R104" and "R106" in Expression (1) represent a resistance value of the resistor R104 and resistance value of the resistor R106, respectively.

$$Vg1 = Vin \times R106/(R104 + R106) \quad (1)$$

The transistor FT1 is in an on-state when the voltage across the gate and the source is equal to or greater than a threshold voltage. Accordingly, when "Vth1" represents a threshold voltage of the transistor FT1, the transistor FT1 is in an on-state when the voltage Vout satisfies the condition defined by Expression (2).

$$Vout < Vg1 - Vth1 \quad (2)$$

When "Vmax1" represents a maximum rating of the voltage across the gate and the source of the transistor FT1, the voltage Vout needs to satisfy the condition defined by Expression (3).

$$|Vg1 - Vout| < V\max1 \quad (3)$$

For example, when the transistor FT2 is in an on-state, the gate voltage Vg1 of the transistor FT1 is 0 V (or almost 0 V). Therefore, from Expression (3), the voltage Vout needs to satisfy the condition represented by Expression (4).

$$Vout < V\max1 \quad (4)$$

For example, at startup of the power supply circuit 100, the voltage Vout is 0 V (or almost 0 V) because the capacitor C102 has not been charged. Therefore, from Expression (3), the gate voltage Vg1 of the transistor FT1 needs to satisfy the condition represented by Expression (5).

$$Vg1 < V\max1 \quad (5)$$

The power supply circuit 100 is designed to satisfy Expressions (2) to (5). For example, the power supply circuit 100 illustrated in FIG. 1 is applied when the voltage Vout with a relatively low voltage satisfying Expression (4) is generated. Specifically, the power supply circuit 100 illustrated in FIG. 1 can be applied when the voltage Vout with 5 V is generated from the input voltage Vin with 24 V. A voltage value of each of the input voltage Vin and the voltage Vout is not limited to such an example.

The configuration of the power supply circuit 100 is not limited to the example illustrated in FIG. 1. For example, FIG. 1 illustrates the power supply circuit 100 including a field effect transistor (transistor FT1) that is an element preventing a current flowing to the inductor L100; however, this embodiment is not limited thereto. Specifically, a bipolar transistor or an analog switch may be used as the element preventing the current flowing to the inductor L100.

In this embodiment, it is envisaged that the power supply circuit 100 is a synchronous rectification type; however, the power supply circuit 100 may be asynchronous rectification type (diode rectification type). If the power supply circuit 100 is an asynchronous rectification type, the switching circuit 120 includes a diode in place of the switch SW122. The diode has an anode connected to the ground terminal GND and a cathode connected to the terminal Ps.

Next, description will be given of a device including the power supply circuit 100 with reference to FIG. 2.

FIG. 2 is an explanatory diagram for an example of a device 10 including the power supply circuit 100 illustrated in FIG. 1.

The device 10 is a measurement device (also called an "ultrasonic flowmeter") that measures flow rate of a fluid FL in a pipe PL, for example. The device 10 includes the power supply circuit 100, a signal processing circuit 200 that operates by using the voltage Vout (serving as a power supply voltage) supplied from the power supply circuit 100, and the sensor 300 disposed on an outer surface OF of the pipe PL.

The sensor 300 includes a pair of ultrasound probes 320 (320*a* and 320*b*). The ultrasound probes 320 are arranged on the outer surface OF of the pipe PL. Each ultrasound probe 320 includes an ultrasonic vibrator 322 that transmits and receives ultrasonic waves, and a wedge 324. In FIG. 2, a component (e.g., the ultrasonic vibrator 322) included in each of the ultrasound probes 320*a* and 320*b* is attached with the same alphabet as that attached to the end of the reference sign of the corresponding ultrasound probe 320 at the end of the reference sign of the component.

Each of the wedges 324*a* and 324*b* includes a surface SP (SPa or SPb) inclined relative to the outer surface OF of the pipe PL. The ultrasonic vibrator 322*a* is attached to the surface SPa of the wedge 324*a*, and the ultrasonic vibrator 322*b* is attached to the surface SPb of the wedge 324*b*. The material for the wedge 324 is, for example, resin.

Ultrasonic waves generated in the ultrasonic vibrator 322*a* or 322*b* propagate through the wedge 324, the pipe PL, and the fluid FL at an angle corresponding to an inclination angle of the surface SP relative to the outer surface OF of the pipe PL. The ultrasonic vibrators 322*a* and 322*b* are respectively connected to switches 240*a* and 240*b* included in the signal processing circuit 200 (described later). By the switches 240 (240*a* and 240*b*), one of the ultrasonic vibrators 322*a* and 322*b* is set as a vibrator that transmits ultrasonic waves, and the other is set as a vibrator that receives the ultrasonic waves.

The signal processing circuit 200 is connected to, for example, the output terminal PVo of the power supply circuit 100. The voltage Vout serving as a power supply voltage is supplied to the signal processing circuit 200 from the output terminal PVo of the power supply circuit 100. The signal processing circuit 200 processes a signal Rsig output from the sensor 300. The signal processing circuit 200 is an example of a "predetermined circuit." The signal Rsig is an example of an "output signal of the sensor," and is also an example of a "predetermined signal."

For example, the signal processing circuit 200 includes a controller 220, the switches 240 (240*a* and 240*b*), a transmitter 260, a receiver 262, a time measurement part 280, and a flow-rate calculator 282.

The controller 220 controls components of the signal processing circuit 200. The controller 220 may be implemented by hardware, such as a GPU (Graphics Processing Unit), a DSP (Digital Signal Processor), or an FPGA (Field Programmable Gate Array). Alternatively, the controller 220 may be a processor that controls the components of the signal processing circuit 200. Specifically, the controller 220 may be configured to include one or more CPUs (Central Processing Units). In this case, the controller 220 acts as a functional block that controls the components of the signal processing circuit 200, for example, by executing a control program read from a storage device (not illustrated).

For example, if the controller 220 is configured to include CPUs, one, some, or all of the functions of the controller 220 may be implemented by the CPUs that cooperate in accordance with a program (e.g., the control program). The controller 220 may be configured to include one or more CPUs and hardware, such as a GPU, a DSP, or an FPGA. In this case, one, some, or all of the functions of the controller 220 may be implemented by the hardware, such as a DSP.

The switch 240*a* connects the ultrasound probe 320*a* (specifically, the ultrasonic vibrator 322*a*) to one of the transmitter 260 and the receiver 262 in accordance with an instruction from the controller 220. Similarly, the switch 240*b* connects the ultrasound probe 320*b* (specifically, the ultrasonic vibrator 322*b*) to one of the transmitter 260 and the receiver 262 in accordance with an instruction from the controller 220. The switches 240 (240*a* and 240*b*) are controlled in such a manner that one of the transmitter 260 and the receiver 262 is connected to the ultrasonic vibrator 322*a* and the other is connected to the ultrasonic vibrator 322*b*.

In this embodiment, the switches 240 (240*a* and 240*b*) switch the device (the ultrasonic vibrator 322*a* or the ultrasonic vibrator 322*b*) to which each of the transmitter 260 and the receiver 262 is connected in accordance with an instruction from the controller 220. Accordingly, the relationship between transmission and reception of ultrasonic waves by the ultrasonic vibrators 322*a* and 322*b* is switched.

The transmitter 260 drives the ultrasonic vibrator 322*a* or 322*b* of the sensor 300 in accordance with an instruction from the controller 220, thereby transmitting ultrasonic waves to the fluid FL in the pipe PL. Specifically, the transmitter 260 transmits a signal Tsig for driving the ultrasonic vibrator 322 to the ultrasonic vibrator 322*a* or 322*b* via the switch 240*a* or 240*b*.

The receiver 262 receives from the ultrasonic vibrator 322*a* or 322*b* via the switch 240*a* or 240*b*, the signal Rsig corresponding to the ultrasonic waves received by the ultrasonic vibrator 322*a* or 322*b*. The signal Rsig corresponding to the ultrasonic waves received by the ultrasonic vibrator 322 is obtained by conversion of the ultrasonic waves that have reached the ultrasonic vibrator 322 into an electric signal by the ultrasonic vibrator 322. Furthermore, the receiver 262 generates a pulse signal STsig for measuring the time from transmission to reception of the ultrasonic waves based on the signal Rsig received from the sensor 300 (specifically, the ultrasonic vibrator 322*a* or 322*b*). The receiver 262 then outputs the pulse signal STsig to the time measurement part 280. A method for generating the pulse signal STsig will be described with reference to FIG. 3 (described later).

In the example illustrated in FIG. 2, the transmitter 260 is connected to the ultrasonic vibrator 322*a* via the switch 240*a*. The receiver 262 is connected to the ultrasonic vibrator 322*b* via the switch 240*b*. In this case, the ultrasonic waves generated in the ultrasonic vibrator 322*a* in accordance with the signal Tsig from the transmitter 260 pass through the wedge 324*a* and the pipe PL and are incident on the fluid FL in the pipe PL. The ultrasonic waves incident on the fluid FL in the pipe PL are reflected by an inner surface IF of the pipe PL, pass through the pipe PL and the wedge 324*b*, and propagate to the ultrasonic vibrator 322*b*. The ultrasonic waves that have propagated to the ultrasonic vibrator 322*b* are converted to the signal Rsig, which is an electric signal, by the ultrasonic vibrator 322*b*. The signal Rsig is received by the receiver 262 via the switch 240*b*. The receiver 262 then outputs the pulse signal STsig based on the signal Rsig to the time measurement part 280.

The time measurement part 280 measures the time from transmission to reception of the ultrasonic waves (hereinafter, also referred to as ultrasonic-wave propagation time) based on the pulse signal STsig and the like. In this embodiment, the controller 220 controls switching of the switches 240*a* and 240*b*, whereby the propagation times in two directions are measured by the time measurement part 280. Here, the propagation times in two directions are given by a relationship between transmission and reception of ultrasonic waves by the ultrasonic vibrators 322*a* and 322*b* is opposite to each other. That is, the time measurement part 280 measures the following: the propagation time of ultrasonic waves propagating from the ultrasonic vibrator 322*a* to the ultrasonic vibrator 322*b*, and the propagation time of ultrasonic waves propagating from the ultrasonic vibrator 322*b* to the ultrasonic vibrator 322*a*.

The flow-rate calculator 282 calculates a flow rate of the fluid FL in the pipe PL based on the ultrasonic-wave propagation times measured by the time measurement part 280.

For example, when "Tab" represents a propagation time of ultrasonic waves propagating from the ultrasonic vibrator 322*a* to the ultrasonic vibrator 322*b*, the propagation time Tab is defined by Expression (6). Furthermore, when "Tba" represents a propagation time of ultrasonic waves propagating from the ultrasonic vibrator 322*b* to the ultrasonic vibrator 322*a*, the propagation time Tba is defined by Expression (7). In Expressions (6) and (7), "Cf" represents the speed of sound in the fluid FL, "V" represents the velocity of the fluid FL flowing in the Z-direction, "Θf" represents an angle of incidence in the fluid FL, and "Lf" represents the length of a sound ray SL of ultrasonic waves propagating in the fluid FL.

$$Tab = Lf/(Cf + V\sin\theta f) \tag{6}$$

$$Tba = Lf/(Cf - V\sin\theta f) \tag{7}$$

By solving Expressions (6) and (7) with regard to the flow velocity V, the flow velocity V is represented by Expression (8).

$$V = (Lf/2\sin\theta f) \times (1/Tab - 1/Tba) \tag{8}$$

When "Q" represents a flow rate of the fluid FL, and when "A" represents a cross-sectional area of the pipe PL, the flow rate Q is defined by Expression (9).

Furthermore, when the inner diameter of the pipe PL is 2r, the cross-sectional area A of the pipe PL is defined by Expression (10). Where, "^" in Expression (10) represents an exponentiation operator.

$$Q = V \times A \tag{9}$$

$$A = \pi \times (r\verb|^|2) \tag{10}$$

The angle of incidence θf in the fluid FL is calculated based on Snell's law. When "Cw" represents a speed of sound in the wedge 324, "θw" represents an angle of incidence in the wedge 324*a*, "Cp" represents a speed of sound in the pipe PL, and "θp" represents an angle of incidence in the pipe PL, a relationship between the speed of sound Cf in the fluid FL, the angle of incidence θf in the fluid FL, and the like, is defined by Expression (11).

$$Cw/\sin\theta w = Cp/\sin\theta p = Cf/\sin\theta f \tag{11}$$

In the sensor 300, the speed of sound Cw in the wedge 324 and the angle of incidence θw in the wedge 324*a* are known. Furthermore, if the speed of sound Cf in the fluid FL is known, the angle of incidence θf in the fluid FL is calculated from Expression (11). The flow-rate calculator 282 calculates the flow rate Q of the fluid FL based on the following: the angle of incidence θf in the fluid FL, the length Lf of the sound ray SL in the fluid FL, the ultrasonic-wave propagation times Tab and Tba measured by the time measurement part 280, and Expressions (8) and (9).

Next, with reference to FIG. 3, description will be given of a timing at which the switching operation of the power supply circuit 100 is stopped.

Figure 3:
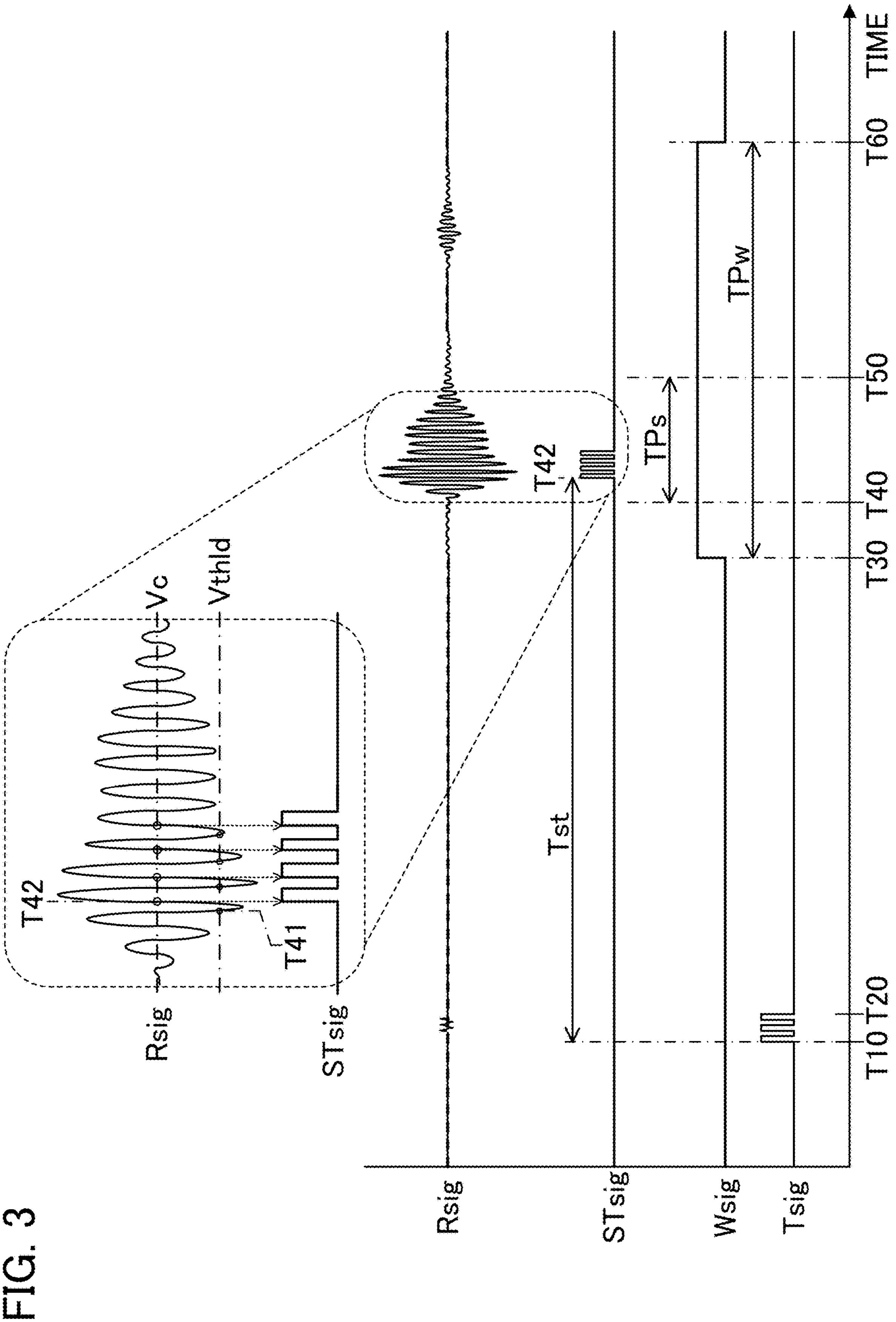
FIG. 3 is an explanatory diagram for an example of a timing at which the switching operation of the power supply circuit illustrated in FIG. 1 is stopped.

FIG. 3 is an explanatory diagram for an example of a timing at which the switching operation of the power supply circuit 100 illustrated in FIG. 1 is stopped. FIG. 3 shows the signal Tsig transmitted from the transmitter 260, the control signal Wsig for switching the transistor FT1 on and off, the signal Rsig received by the receiver 262, and the pulse signal STsig received by the time measurement part 280. The horizontal axis in FIG. 3 represents time. First, description will be given of an example of a method for generating the pulse signal STsig.

As described with reference to FIG. 2, the pulse signal STsig is generated by the receiver 262 based on the signal Rsig. For example, a voltage Vc illustrated in FIG. 3 represents a voltage of the signal Rsig output from the sensor 300 when the ultrasonic vibrator 322 does not transmit ultrasonic waves. A voltage Vthld illustrated in FIG. 3 represents a predetermined voltage compared with the voltage of the signal Rsig by a comparator (not illustrated) included in the receiver 262.

For example, based on the result of comparison by the comparator (not illustrated) that compares the voltage of the signal Rsig and the voltage Vthld, the receiver 262 identifies a specific timing at which the voltage of the signal Rsig relative to the voltage Vc is equal to or greater than the voltage Vthld relative to the voltage Vc (e.g., time T41). The receiver 262 then raises the pulse signal STsig at the first timing at which the voltage of the signal Rsig is equal to or greater than the voltage Vc after the specific timing (e.g., time T42). The receiver 262 causes the pulse signal STsig to fall at the first timing at which the voltage of the signal Rsig is equal to or less than the voltage Vc after the pulse signal STsig is raised. The timing at which the pulse signal STsig is caused to fall may be a timing at which a predetermined time has passed after the pulse signal STsig is raised.

The time measurement part 280 obtains the propagation times Tab and Tba by, for example, measuring time Tst from time T10 to time T42. Here, time T10 represents time at which the signal Tsig for causing the ultrasonic vibrator 322 to transmit ultrasonic waves has been transmitted. Time T42 represents time of the first rising of the pulse signal STsig.

Next, description will be given of timings of the signals Tsig and Rsig. In this example, the transmitter 260 is connected to the ultrasonic vibrator 322*a* via the switch 240*a*, and the receiver 262 is connected to the ultrasonic vibrator 322*b* via the switch 240*b*.

For example, the transmitter 260 transmits the signal Tsig to the ultrasonic vibrator 322*a* from time T10 to time T20. Thereafter, the ultrasonic vibrator 322*a* transmits ultrasonic waves. For example, by propagation of the ultrasonic waves transmitted from the ultrasonic vibrator 322*a* to the ultrasonic vibrator 322*b*, the receiver 262 receives the signal Rsig corresponding to the ultrasonic waves received by the ultrasonic vibrator 322*b*.

In the example illustrated in FIG. 3, ultrasonic waves are transmitted from the ultrasonic vibrator 322*a* in response to the signal Tsig, and then are converted into an electric signal Rsig by the ultrasonic vibrator 322*b*. The signal Rsig is received by the receiver 262 from time T40 to time T50. In this case, for example, the period from time T40 to time T50 corresponds to a signal processing period TPs in which the signal Rsig is processed by the signal processing circuit 200 (in more detail, the receiver 262). For example, at time T41, the voltage of the signal Rsig relative to the voltage Vc is equal to or greater than the voltage Vthld relative to the voltage Vc. The receiver 262 raises the pulse signal STsig at time T42 at which the voltage of the signal Rsig is equal to or greater than the voltage Vc. The signal processing period TPs is an example of a "predetermined period."

In this embodiment, the switching operation, which is used to switch between (i) a storing period for storing energy in the inductor L100 and (ii) a discharge period for discharging the energy stored in the inductor L100, is stopped at least in the signal processing period TPs. That is, the switching operation of the power supply circuit 100 is stopped in the signal processing period TPs.

For example, the control signal Wsig for switching "On" and "Off" of the transistor FT1 transitions from a low level to a high level at time T30 prior to time T40 (the start time of the signal processing period TPs). The control signal Wsig is maintained at a high level in a period TPw from time T30 to time T60. Time T60 is later than time T50 (the end time of the signal processing period TPs). The control signal Wsig then transitions from a high level to a low level at time T60. Thereafter, the transistor FT1 is in an off-state at time T30 and maintained in an off-state in the period TPw. That is, in this embodiment, the transistor FT1 is in an off-state in the period TPw including the signal processing period TPs. The transistor FT1 is in an on-state in a period other than the period TPw. As a result, the switching operation, which is used to switch between the storing period and the discharge period, is stopped in the period TPw.

Thus, in this embodiment, the switching operation, which is used to switch the storing period and the discharge period, is stopped in the period TPw including the signal processing period TPs. For this reason, switching noise caused by the switching operation is prevented from being generated in the signal processing period TPs. In this embodiment, it is possible to prevent the switching noise from propagating to the signal processing circuit 200 and the sensor 300 in the signal processing period TPs.

When switching noise is generated in the signal processing period TPs, Signal-to-Noise Ratio (SNR) of the signal Rsig processed by the receiver 262 is smaller than when no switching noise is generated in the signal processing period TPs. In particular, for a weak signal Rsig (e.g., an output signal of the sensor 300), the signal Rsig is more sensitive to the switching noise and the SNR is smaller, as compared with a strong signal Rsig. For a small SNR, an error may more easily be generated in the result of signal processing than a large SNR. For example, when switching noise is generated in the signal processing period TPs, there is a risk that jitter is generated in the pulse signal STsig because of the influence of the switching noise. When jitter is generated in the pulse signal STsig, there is a risk that, for example, fluctuations in the measurement results of the ultrasonic-wave propagation times Tab and Tba become large, resulting in a decrease in the calculation accuracy of the flow rate Q of the fluid FL.

In this embodiment, since generation of switching noise in the signal processing period TPs is prevented, an error caused by the switching noise is prevented from being generated in the processing result of the signal Rsig. As a result, in this embodiment, for example, the device 10 can prevent generation of fluctuations in the measurement result of the ultrasonic-wave propagation times Tab and Tba and can calculate the flow rate Q of the fluid FL accurately.

For a purpose of stopping the switching operation of the power supply circuit 100 in the signal processing period TPs, a control method is suggested in which an enable signal supplied to the terminal Pe of the switching circuit 120 is set at a low level in the signal processing period TPs. However, when the operation of the switching circuit 120 is stopped by using the enable signal supplied to the terminal Pe, it may take more time to switch stopping and resuming the switching operation as compared with use of the transistor FT1. For example, in an ultrasonic flowmeter, a period of tens of microseconds to hundreds of microseconds is enough as the period TPw. In contrast, when the operation of the switching circuit 120 is stopped by using the enable signal supplied to the terminal Pe, the switching operation may be stopped for a period of several milliseconds. In this case, the period for stopping the switching operation is longer than necessary.

For example, in the period for stopping the switching operation a current is supplied from the capacitor C102 to the output terminal PVo. As a result, when the period for stopping the switching operation is long, it is necessary to make the capacitance of the capacitor C102 greater than when the period for stopping the switching operation is short. A greater capacitance of the capacitor C102 makes a size of the capacitor C102 increased as compared with when the capacitance of the capacitor C102 is small, which increases cost of the power supply circuit 100.

In this embodiment, by placing the transistor FT1 in an off-state without stopping the operation of the switching circuit 120, it is possible to stop the switching operation of the power supply circuit 100 in the signal processing period TPs. In this case, since the operation of the switching circuit 120 is not stopped, the switching operation is resumed by the transition of the control signal Wsig to a low level. Accordingly, in this embodiment, it is possible to prevent the period for stopping the switching operation from being longer than necessary, so that the size increase of the capacitor C102 is prevented. In this embodiment, it is possible to prevent generation of switching noise in the signal processing time TPs while suppressing increase in the cost of the power supply circuit 100. Furthermore, in this embodiment, since it is possible to prevent the period for stopping the switching operation from being longer than necessary, the usability of the power supply circuit 100 is improved.

An interval between (i) the time of transmission of the signal Tsig (times T10 and T20) and (ii) the start time and the end time of the signal processing period TPs (times T40 and T50) are estimated to some degree based on, for example, parameters of the wedge 324, the pipe PL, and the fluid FL. As the period TPw, a period is defined in which an allowance is added to some extent to the start time and the end time of the estimated signal processing period TPs. Measured values of the start time and the end time of the signal processing period TPs may be fed back to setting of the period TPw.

Next, with reference to FIG. 4, description will be given of other advantages when the power supply circuit 100 is used.

Figure 4:
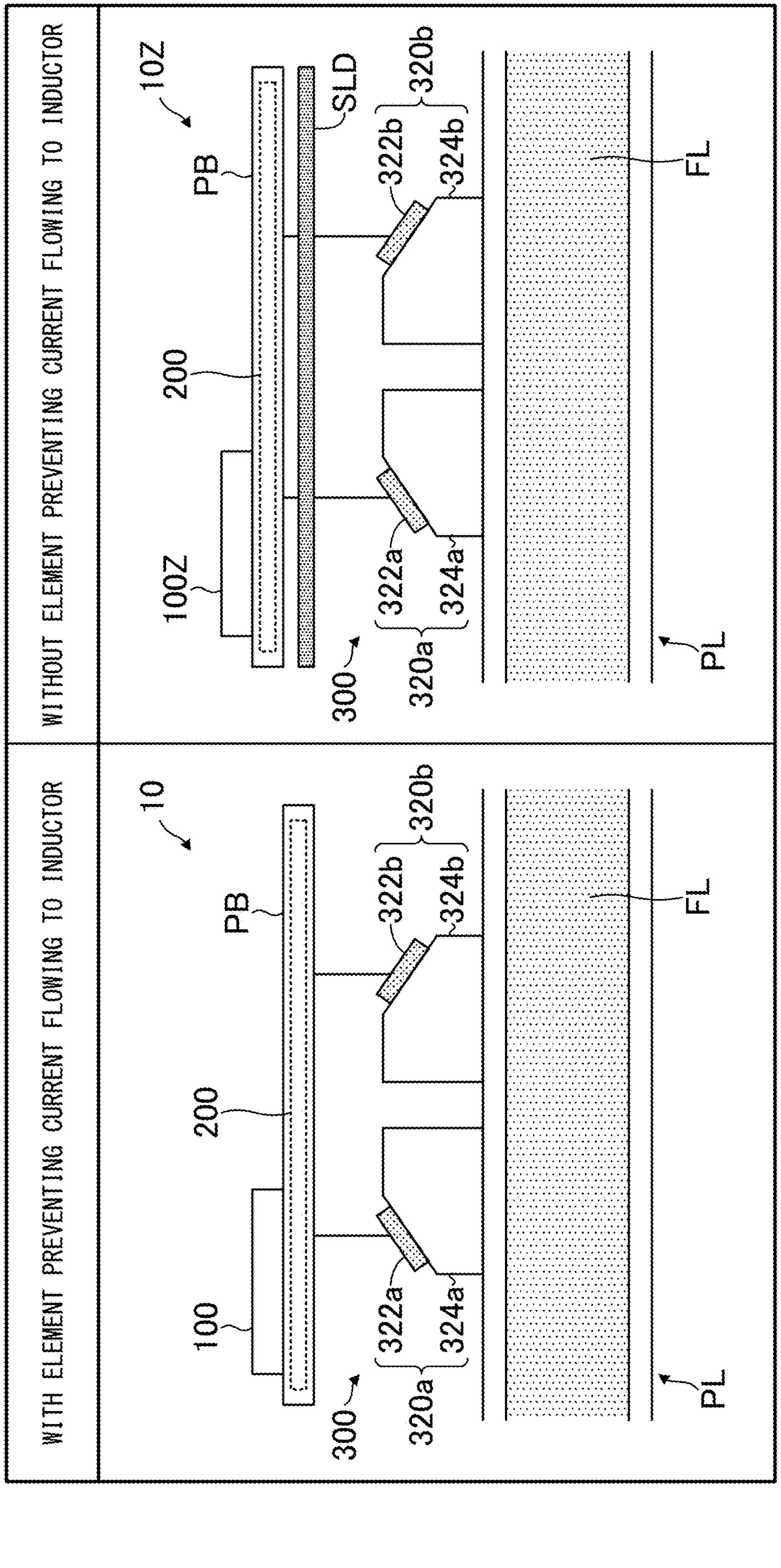
FIG. 4 is an explanatory diagram for advantages of the power supply circuit illustrated in FIG. 1.

FIG. 4 is an explanatory diagram for advantages of the power supply circuit 100 illustrated in FIG. 1. In FIG. 4, description “with element preventing current flowing to inductor” represents the overview of the device 10 including the power supply circuit 100 according to this embodiment. In addition, in FIG. 4, the description “without element preventing current flowing to inductor” represents the overview of a device 10Z including a power supply circuit 100Z that is compared with the power supply circuit 100. The power supply circuit 100Z is substantially the same as the power supply circuit 100 illustrated in FIG. 1, except that an element preventing a current flowing to the inductor 100 (e.g., the transistor FT1) is omitted from the power supply circuit 100.

In FIG. 4, it is envisaged that the signal processing circuit 200 is included in a printed circuit board PB. For this reason, the device 10 includes the power supply circuit 100, the printed circuit board PB including the signal processing circuit 200, and the sensor 300. First, description will be given of the device 10Z to be compared with the device 10.

The device 10Z is substantially the same as the device 10 except that (i) the device 10Z includes the power supply circuit 100Z in place of the power supply circuit 100 and (ii) the device 10Z includes a shield member SLD. The device 10Z includes the power supply circuit 100Z, the printed circuit board PB including the signal processing circuit 200, the shield member SLD, and the sensor 300. The power supply circuit 100Z is substantially the same as the power supply circuit 100 except that the transistors FT1 and FT2, the resistors R104 and R106, and the diode D100 are omitted from the power supply circuit 100. For this reason, in the power supply circuit 100Z, switching noise is generated in the signal processing period TPs for processing the signal Rsig.

In light of this, a shield member SLD is disposed between the power supply circuit 100Z and the sensor 300 in the device 10Z, as illustrated in description “without element preventing current flowing to inductor” in FIG. 4. The shield member SLD prevents propagation of the switching noise from the power supply circuit 100Z to the sensor 300. The shield member SLD may be a shield sheet, or it may be a shield plate. In the device 10Z, the signal Rsig (output signal of the sensor 300) output from the sensor 300 is prevented from containing the switching noise due to the shield member SLD disposed between the power supply circuit 100Z and the sensor 300. However, in the device 10Z, the switching noise may propagate from the power supply circuit 100Z to the sensor 300 via wiring connecting the sensor 300 and the signal processing circuit 200 to each other. The wiring, which connects the sensor 300 and the signal processing circuit 200 to each other, is used to transmit a signal Rsig from the sensor 300 to the signal processing circuit 200.

The device 10Z has a more complicated configuration as compared with the device 10. This is because the shield member SLD is disposed between the power supply circuit 100Z and the sensor 300. Such complicated configuration makes the device 10Z bigger than the device 10. The cost of the device 10Z is also higher compared to that of the device 10.

In contrast, in this embodiment, generation of switching noise in the signal processing period TPs for processing a signal Rsig is prevented, which allows for omission of the shield member SLD, as illustrated in the description "with element preventing current flowing to inductor" in FIG. 4. As a result, this embodiment allows for a simple configuration of the device 10, and it is possible to miniaturize the device 10 and reduce the cost of the device 10.

Thus, in this embodiment, the power supply circuit 100 includes an input terminal PVi that receives an input voltage Vin, an inductor L100 including terminals P1 and P2, a switching circuit 120 that is electrically connected to the terminal P1 and that switches between a storing period for storing energy in the inductor L100 and a discharge period for discharging the energy stored in the inductor L100, an output terminal PVo that receives a current from the inductor L100 in the storing period and the discharge period, and a transistor FT1 that is electrically connected to the terminal P2 and serves as a portion of a path of a current flowing to the inductor L100 in the storing period and the discharge period.

The output terminal PVo outputs a voltage Vout based on the storing period, the discharge period, and the input voltage Vin.

A signal processing circuit 200 is provided which operates by using the voltage Vout output from the output terminal PVo as a power supply voltage. The signal processing circuit 200 is processing the signal Rsig in a signal processing period TPs. In the signal processing period TPs, the transistor FT1 stops a switching operation that is used to switch between the storing period and the discharge period by preventing current flowing to the inductor L100.

Furthermore, the device 10 according to this embodiment includes the power supply circuit 100, the sensor 300, and the signal processing circuit 200. The signal processing circuit 200 receives a power supply voltage (voltage Vout) from the output terminal PVo of the power supply circuit 100 and processes an output signal of the sensor 300 as the signal Rsig.

Thus, in this embodiment, the switching operation, which is used to switch the storing period and the discharge period, is stopped in the signal processing period TPs during which the signal Rsig is processed by the signal processing circuit 200. Accordingly, in this embodiment, generation of switching noise caused by the switching operation in the signal processing period TPs is prevented. In this embodiment, it is possible to prevent generation of switching noise caused by the switching operation in the signal processing period TPs without providing the shield member SLD to prevent noise propagation from the power supply circuit 100 to the sensor 300. In this embodiment, increase in the cost of the device 10 is suppressed, and it is possible to prevent generation of an error caused by the switching noise in the processing result of the signal Rsig.

In this embodiment, it is possible to stop the switching operation by preventing the current flowing to the inductor L100 without stopping the operation of the switching circuit 120. Accordingly, in this embodiment, even when it takes some time to switch stopping and resuming the operation of the switching circuit 120, it is possible to prevent the time to switch between stop and resume of the switching operation from being longer, and therefore, the usability of the power supply circuit 100 is improved.

In this embodiment, the switching circuit 120 brings the input terminal PVi and the terminal P1 into a conductive state in the storing period. The switching circuit 120 brings them into a nonconductive state in the discharge period. The transistor FT1 brings the terminal P2 and the output terminal PVo into a conductive state in the storing period and the discharge period. The transistor FT1 brings them into a nonconductive state in the signal processing period TPs. A current is supplied to the output terminal PVo from the inductor L100 in the storing period and the discharge period. The output terminal PVo outputs the voltage Vout based on the storing period, the discharge period, and the input voltage Vin.

As a result, in this embodiment, the power supply circuit 100 operates as a step-down switching power supply that outputs a voltage Vout that is less than the input voltage Vin. Thus, in this embodiment, it is possible to stop the switching operation in the signal processing period TPs by preventing the current flowing to the inductor L100, even when the power supply circuit 100 operates as a step-down switching power supply. Even when the transistor FT1 is switched from an on-state to an off-state, this embodiment provides advantageous effects in that generation of switching noise caused by the switching operation is prevented in the signal processing period TPs.

In this embodiment, the power supply circuit 100 further includes the diode D100 that is electrically connected to the terminal P2 of the inductor L100 and serves as a portion of a path of the current flowing to the inductor L100 when the switching operation is stopped. For example, the power supply circuit 100 includes the diode D100. The diode D100 has the anode electrically connected to the terminal P2 and the cathode electrically connected to the input terminal PVi. Accordingly, in this embodiment, when the transistor FT1 is switched from an on-state to an off-state, energy stored in the inductor L100 is discharged as a current to the input terminal PVi due to the diode D100, and therefore, damage to an element such as the transistor FT1 is avoided.

A2: Second Embodiment

Figure 5:
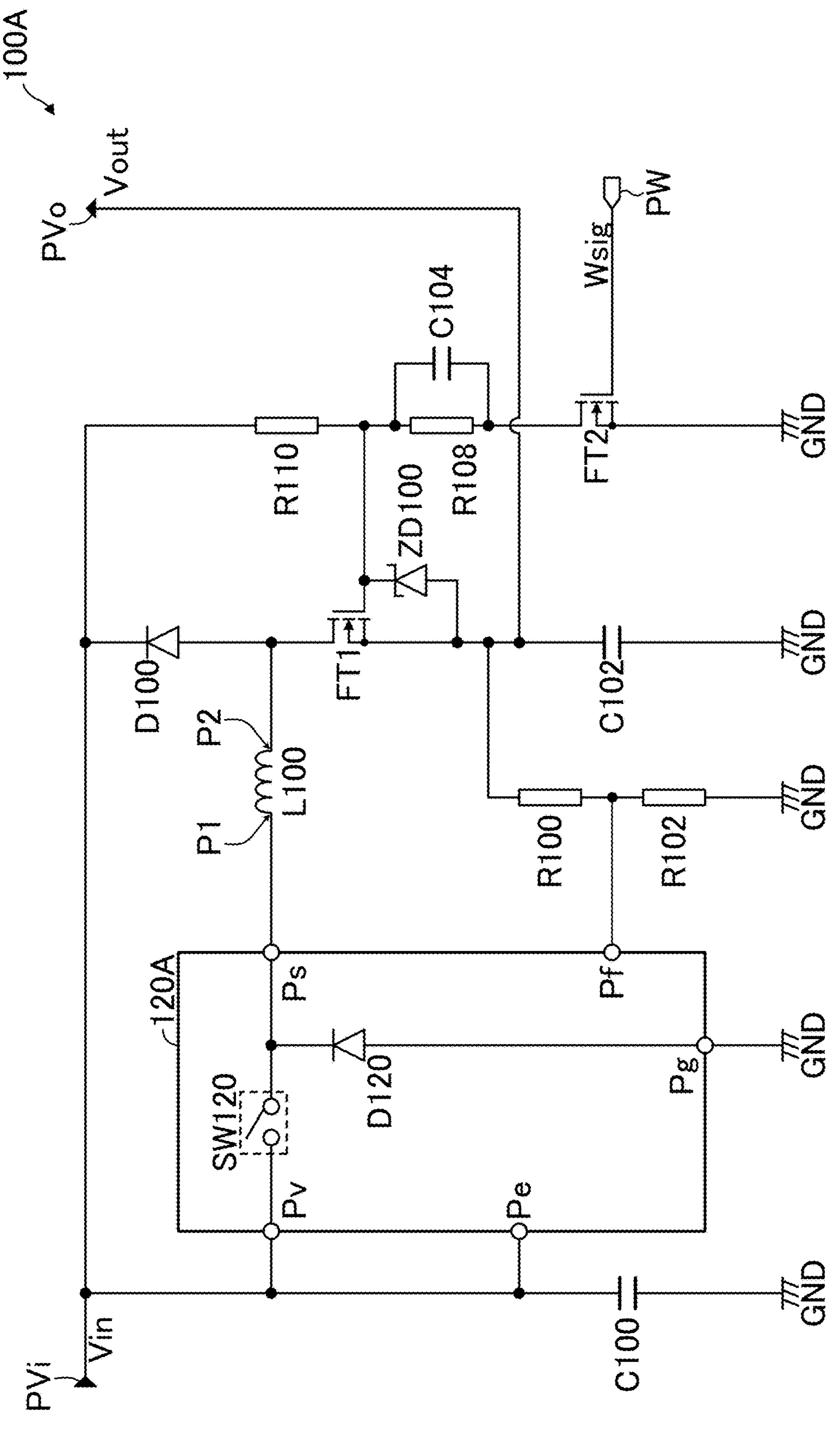
FIG. 5 is an explanatory diagram for an example of a power supply circuit according to a second embodiment.

FIG. 5 is an explanatory diagram for an example of a power supply circuit 100A according to a second embodiment. Components substantially the same as those in FIGS. 1 to 4 are denoted by like reference signs, and detailed explanations thereof are omitted. In this embodiment, the power supply circuit 100A is a step-down switching power supply that outputs a voltage Vout that is less than the input voltage Vin.

The power supply circuit 100A includes a switching circuit 120A in place of the switching circuit 120 illustrated in FIG. 1. As to the power supply circuit 100A, the resistors R104 and R106 illustrated in FIG. 1 are omitted. Resistors R108 and R110, a capacitor C104, and a Zener diode ZD100 are provided. The rest of the configuration of the power supply circuit 100A is substantially the same as that of the power supply circuit 100 illustrated in FIG. 1.

The switching circuit 120A switches between a storing period for storing energy in the inductor L100 and a discharge period for discharging the energy stored in the inductor L100, similarly to the switching circuit 120 illustrated in FIG. 1. For example, the switching circuit 120A includes a diode D120 in place of the switch SW122 illustrated in FIG. 1. The diode D120 has an anode connected to the ground terminal GND and a cathode connected to the terminal Ps. That is, the power supply circuit 100A including the switching circuit 120A is an asynchronous rectification type (diode rectification type).

For example, in the storing period, the switch SW120 is in an on-state, so that a current is supplied to the output terminal PVo from the input terminal PVi via the switch SW120, the inductor L100, and the transistor FT1. In the discharge period, the switch SW120 is in an off-state, so that a current is supplied to the output terminal PVo from the ground terminal GND via the diode D120, the inductor L100, and the transistor FT1.

The resistors R108 and R110 are connected in series between the drain of the transistor FT2 and the input terminal PVi. Specifically, one end of the resistor R108 is connected to the drain of the transistor FT2, the other end of the resistor R108 is connected to one end of the resistor R110, and the other end of the resistor R110 is connected to the input terminal PVi. A connection node between the resistor R108 and the resistor R110 is connected to the gate of the transistor FT1.

One end of the capacitor C104 is connected to the gate of the transistor FT1. The other end of the capacitor C104 is connected to the drain of the transistor FT2. When the transistor FT2 is in an on-state, the capacitor C104 quickly lowers the gate voltage Vg1 of the transistor FT1 to cause a quick transition of the transistor FT1 to an off-state.

The anode of the Zener diode ZD100 is connected to the source of the transistor FT1, and the cathode of the Zener diode ZD100 is connected to the gate of the transistor FT1. The Zener diode ZD100 is an example of a "voltage control element." The anode of the Zener diode ZD100 is an example of a "fourth terminal." The cathode of the Zener diode ZD100 is an example of a "third terminal."

In the power supply circuit 100A illustrated in FIG. 5, the transistor FT2 is in an off-state, whereby the transistor FT1 is in an on-state. For example, when the transistor FT2 is in an off-state, no current flows through the resistors R108 and R110, and therefore, the gate voltage Vg1 of the transistor FT1 is equal to the input voltage Vin. As a result, the condition for placing the transistor FT1 in an on-state when the transistor FT2 is in an off-state is represented by Expression (12) using the threshold voltage Vth1 of the transistor FT1.

$$Vout < Vin - Vth1 \tag{12}$$

In general, the input voltage Vin is considerably greater than the threshold voltage Vth1. Accordingly, the power supply circuit 100A illustrated in FIG. 5 is applied when a relatively high voltage Vout is generated.

When the transistor FT2 is in an on-state, the transistor FT1 enters an off-state. For example, the gate voltage Vg1 of the transistor FT1 when the transistor FT2 is in an on-state is represented by Expression (13) by using the input voltage Vin. In Expression (13), R108 and R110 represent the resistance value of the resistor R108 and the resistance value of the resistor R110, respectively.

$$Vg1 = Vin \times R108/(R108 + R110) \tag{13}$$

The condition for placing the transistor FT1 in an off-state is represented by Expression (14) using the threshold voltage Vth1 of the transistor FT1.

$$Vg1 < Vout + Vth1 \tag{14}$$

From Expression (14), the power supply circuit 100A should be used when the voltage Vout is greater. For example, the power supply circuit 100A illustrated in FIG. 2 is used when a voltage Vout with 18V is generated from an input voltage Vin with 24 V. Each of the input voltage Vin and the voltage Vout is not limited to such an example.

Here, the gate voltage Vg1 of the transistor FT1 will be discussed when the Zener diode ZD100 is omitted from the power supply circuit 100A. At startup of the power supply circuit 100A, the capacitor C102 has not been charged. As a result, the gate voltage Vg1 of transistor FT1 at startup of the power supply circuit 100A is the voltage across the gate and the source. When the transistor FT2 is in an off-state and the gate voltage Vg1 of the transistor FT1 is equal to the input voltage Vin, there is a risk that the voltage across the gate and the source of the transistor FT1 exceeds the maximum rating Vmax1 as represented by Expression (15).

$$Vin = Vg1 > V\max1 \tag{15}$$

In this embodiment, the Zener diode ZD100 is connected between the gate and the source of the transistor FT1. The Zener diode ZD100 operates so as not to allow the voltage across the gate and the source of the transistor FT1 to exceed the maximum rating Vmax1. The maximum rating Vmax1 is an example of a "predetermined voltage." The voltage across the gate and the source of the transistor FT1 is limited to, for example, the breakdown voltage of the Zener diode ZD100. As a result, when the breakdown voltage of the Zener diode ZD100 satisfies Expression (16), the voltage across the gate and the source of the transistor FT1 does not exceed the maximum rating Vmax1. Where "Vzd1" in Expression (16) represents the breakdown voltage of the Zener diode ZD100.

$$Vzd1 < V\max1 \tag{16}$$

Thus, in the power supply circuit 100A illustrated in FIG. 5, the voltage across the gate and the source of the transistor FT1 is limited so as not to exceed the maximum rating Vmax1 by use of the Zener diode ZD100 satisfying Expression (16).

The configuration of the power supply circuit 100A is not limited to the example illustrated in FIG. 5. For example, a voltage control element, which is an element limiting the voltage across the gate and the source of the transistor FT1, is not limited to the Zener diode ZD100 as long as it can limit the voltage. The voltage control element may be a diode, a surge absorber, or a varistor. For example, the power supply circuit 100A may include the switching circuit 120 illustrated in FIG. 1 in place of the switching circuit 120A. The device 10 according to this embodiment is substantially the same as the device 10 illustrated in FIG. 2 and the like except for including the power supply circuit 100A in place of the power supply circuit 100 illustrated in FIG. 1.

In the foregoing embodiment, substantially the same effects as those in the first embodiment described above can be obtained. In this embodiment, the power supply circuit 100A includes the Zener diode ZD100 that has a cathode and an anode and operates so as not to allow the voltage at the cathode relative to a voltage at the anode to exceed the maximum rating Vmax1 of the voltage across the gate and the source of the transistor FT1. The transistor FT1 is a field effect transistor. The cathode of the Zener diode ZD100 is connected to the gate of the field effect transistor (transistor FT1). The anode of the Zener diode ZD100 is connected to the source of the field effect transistor (transistor FT1). Thus, in this embodiment, the voltage across the gate and the source of the transistor FT1 is limited so as not to exceed the maximum rating Vmax1 due to the Zener diode ZD100, and it is therefore possible to prevent an element such as the transistor FT1 from being broken.

A3: Third Embodiment

Figure 6:
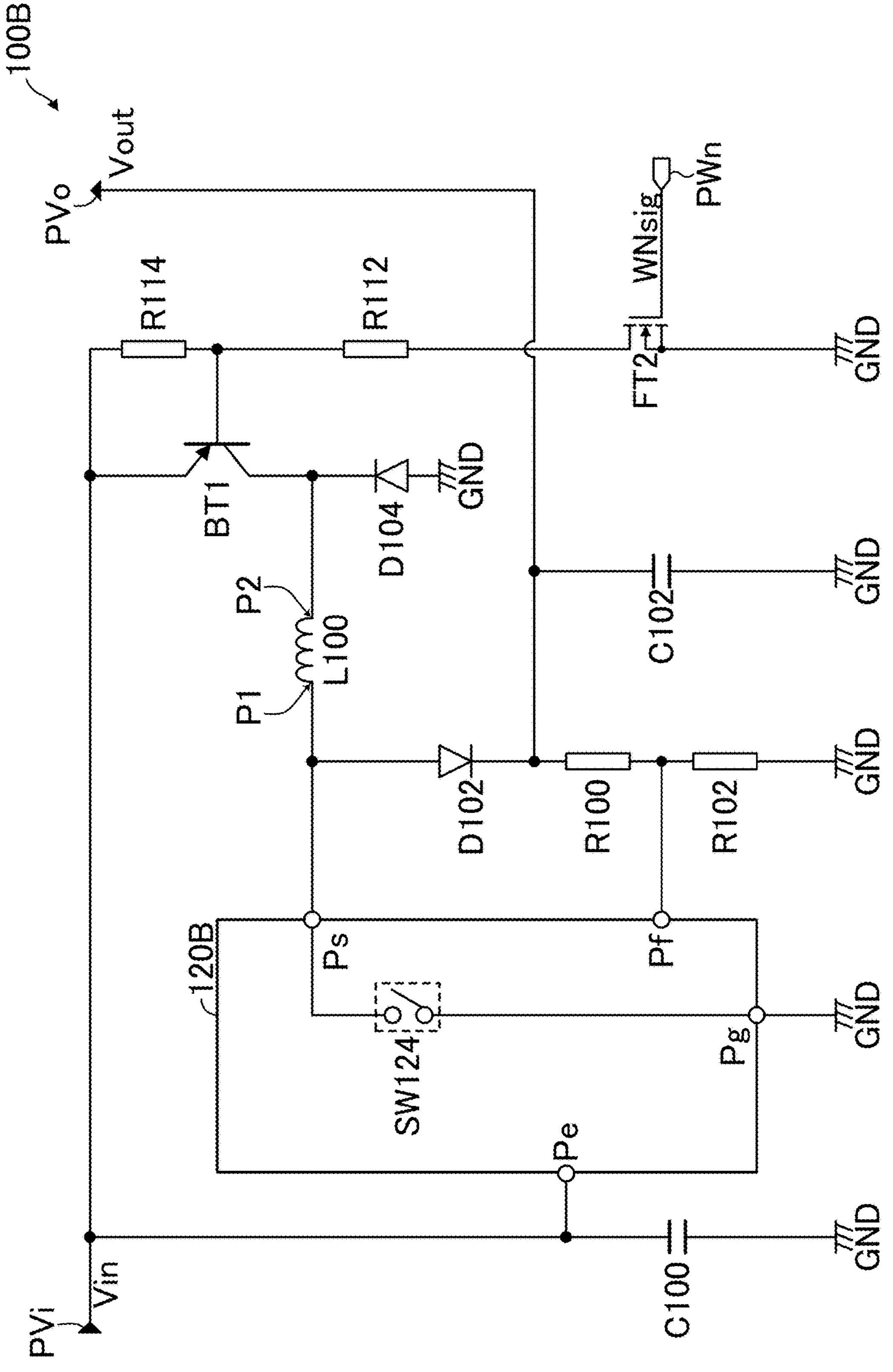
FIG. 6 is an explanatory diagram for an example of a power supply circuit according to a third embodiment.

FIG. 6 is an explanatory diagram for an example of a power supply circuit 100B according to a third embodiment. Components substantially the same as those described in FIGS. 1 to 5 are denoted by like reference signs, and detailed explanations thereof are omitted. In this embodiment, the power supply circuit 100B is a step-up switching power supply that outputs the voltage Vout greater than the input voltage Vin. For example, the power supply circuit 100B illustrated in FIG. 6 may be applied when the voltage Vout with 35 V is generated from the input voltage V with 24 V. Each of the input voltage Vin and the voltage Vout is not limited to such an example.

The power supply circuit 100B includes a switching circuit 120B in place of the switching circuit 120 illustrated in FIG. 1. As to the power supply circuit 100B, the resistors R104 and R106 and the transistor FT1 illustrated in FIG. 1 are omitted. Resistors R112 and R114, a bipolar transistor BT1, and diodes D102 and D104 are provided. The rest of the configuration of the power supply circuit 100B is substantially the same as that of the power supply circuit 100 illustrated in FIG. 1. However, in FIG. 6, the polarity of a control signal WNsig for preventing a current flowing to the inductor L100 is opposite to that of the control signal Wsig described with reference to FIG. 1 and the like. The reference sign of the control terminal PW to which the control signal WNsig is supplied is attached with a lowercase alphabet "n" at its end.

The bipolar transistor BT1 is an example of the "first element." The bipolar transistor BT1 is, for example, a PNP transistor. The PNP transistor has a collector connected to the terminal P2 of the inductor L100 and an emitter connected to the input terminal PVi. The PNP transistor switches between (i) an on-state in which the terminal P2 of the inductor L100 and the input terminal PVi are conductive and (ii) an off-state in which they are not conductive. Specifically, when the bipolar transistor BT1 is in an on-state, the terminal P2 of the inductor L100 and the input terminal PVi are conductive. When the bipolar transistor BT1 is in an off-state, the terminal P2 of the inductor L100 and the input terminal PVi are nonconductive. The base of the bipolar transistor BT1 is connected to a connection node between the resistor R112 and the resistor R114 (described later). Switching ON and OFF of the bipolar transistor BT1 will be described later.

The resistors R112 and R114 are connected in series between the drain of the transistor FT2 and the input terminal PVi. Specifically, a first end (one end) of the resistor R112 is connected to the drain of the transistor FT2. A second end (the other end) of the resistor R112 is connected to a first (one end) of the resistor R114. A second (the other end) of the resistor R114 is connected to the input terminal PVi. The connection node between the resistor R112 and the resistor R114 is connected to the base of the bipolar transistor BT1.

The anode of the diode D102 is connected to the terminal P1 of the inductor L100. The cathode of the diode D102 is connected to the output terminal PVo.

Similarly to the switching circuit 120 illustrated in FIG. 1, the switching circuit 120B switches between a storing period for storing energy in the inductor L100 and a discharge period for discharging the energy stored in the inductor L100. For example, the switching circuit 120B includes terminals Ps, Pf, Pg, and Pe and a switch SW124, such as a field effect transistor. Also in FIG. 6, some components included in the switching circuit 120B are illustrated, and illustrations of the rest of the components are omitted for clarity. Since the terminals Pf, Pg, and Pe of the switching circuit 120B are substantially the same as the terminals Pf, Pg, and Pe of the switching circuit 120 described in FIG. 1, explanations thereof are omitted.

The switch SW124 is connected between the terminal Ps and the terminal Pg and switches between (i) an on-state in which the terminal Ps and the terminal Pg are conductive and (ii) an off-state in which they are not conductive. For example, when the switch SW124 is in an on-state, the terminal Ps and the terminal Pg become conductive. When the switch SW124 is in an off-state, the terminal Ps and the terminal Pg become nonconductive.

For example, in the storing period, the switch SW124 is in an on-state, so that a current flows from the input terminal PVi to the ground terminal GND via the bipolar transistor BT1, the inductor L100, and the switch SW124. Accordingly, energy is stored in the inductor L100. In the discharge period, the switch SW124 is in an off-state. Accordingly, the energy stored in the inductor L100 is discharged, and a current is supplied from the input terminal PVi to the output terminal PVo via the bipolar transistor BT1, the inductor L100, and the diode D102.

Switching ON and OFF of the bipolar transistor BT1 is achieved by the transistor FT2 switching on and off.

For example, the transistor FT2 is in an off-state by a low-level control signal WNsig being supplied to a control terminal PWn connected to the gate thereof. When the transistor FT2 is in an off-state, no current flows through the resistors R112 and R114, and therefore, no current is supplied to the base of the bipolar transistor BT1. As a result, the bipolar transistor BT1 is turned in an off-state, and a current flowing to the inductor L100 is prevented. In addition, a switching operation, which is used to switch between the storing period and the discharge period, is stopped. In this embodiment, maintaining a low-level control signal WNsig in the period TPw illustrated in FIG. 3 stops the switching operation in the period TPw. As a result, in this embodiment, it is possible to prevent generation of switching noise in the signal processing period TPs included in the period TPw.

In this embodiment, the resistor R114 is connected between the base and the emitter of the bipolar transistor BT1. When the bipolar transistor BT1 is in an off-state, the resistor R114 has a function of quickly lowering the voltage across the emitter and the base of the bipolar transistor BT1 to cause a quick transition of the bipolar transistor BT1 to an off-state.

When a high-level control signal WNsig is supplied to the gate of the transistor FT2 via the control terminal PWn, the transistor FT2 is in an on-state, so that a current is supplied to the base of the bipolar transistor BT1. As a result, the bipolar transistor BT1 enters an on-state, and the switching operation is resumed. In this embodiment, since the switching operation is stopped without stopping the operation of the switching circuit 120B, it is possible to avoid the time required for switching stopping and resuming the switching operation from being longer. The control signal WNsig is maintained at a high level, for example, in a period other than the period TPw illustrated in FIG. 3. The gate of the transistor FT2 may be connected to the input terminal PVi via a pull-up resistor such that the transistor FT2 is maintained at a high level for a high-impedance control terminal PWn.

In this embodiment, the power supply circuit 100B includes the diode D104 having the anode grounded and the cathode electrically connected to the terminal P2 of the inductor L100. When a current flowing to the inductor L100 is prevented in response to switching of the bipolar transistor BT1 from an on-state to an off-state, the diode D104 acts as a circuit by which the energy stored in the inductor L100 is transferred to the output terminal PVo as a current. That is, the diode D104 serves as a portion of a path of the current flowing to the inductor L100 until discharge of the energy stored in the inductor L100 ends, when the switching operation is stopped.

In a configuration in which the diode D104 is omitted, the energy stored in the inductor L100 is not discharged as a current when the bipolar transistor BT1 is switched from an on-state to an off-state. Accordingly, in the configuration in which diode D104 is omitted, when the bipolar transistor BT1 is switched from an on-state to an off-state, there is a risk that a high voltage will be generated in the inductor L100, causing elements including the switching circuit 120B to be damaged. In this embodiment, when the bipolar transistor BT1 is switched from an on-state to an off-state, the energy stored in the inductor L100 is discharged as a current to the output terminal PVo due to the diode D104, and therefore, damage to elements including the switching circuit 120B is prevented.

The configuration of the power supply circuit 100B is not limited to the example illustrated in FIG. 6. For example, FIG. 6 illustrates the power supply circuit 100B using the bipolar transistor BT1 as an element preventing a current flowing to the inductor L100. However, this embodiment is not limited thereto. Specifically, a field effect transistor or an analog switch may be used as the element preventing the current flowing to the inductor L100. The device 10 according to this embodiment is substantially the same as the device 10 illustrated in FIG. 2 except for including the power supply circuit 100B in place of the power supply circuit 100 illustrated in FIG. 1.

Thus, this embodiment provides the same effects as those in the first and second embodiments. In addition, in this embodiment, the switching circuit 120B brings the terminal P1 and the ground terminal GND that receives the ground voltage into a conductive state in the storing period. The switching circuit 120B brings them into a nonconductive state in the discharge period. The bipolar transistor BT1 brings the terminal P2 and the input terminal PVi into a conductive state in the storing period and the discharge period. The bipolar transistor BT1 brings them into a non-conductive state in the signal processing period TPs.

As a result, in this embodiment, the power supply circuit 100B operates as a step-up switching power supply that outputs the voltage Vout that is greater than the input voltage Vin. In this embodiment, it is possible to stop the switching operation in the signal processing period TPs by preventing a current flowing to the inductor L100, even when the power supply circuit 100B operates as a step-up switching power supply. As a result, generation of switching noise caused by the switching operation is prevented in the signal processing period TPs. This embodiment provides advantageous effects substantially the same as those of the foregoing embodiments.

In this embodiment, the power supply circuit 100B further includes the diode D104. The diode D104 is electrically connected to the terminal P2 of the inductor L100. The diode D104 serves as a portion of a path of the current flowing to the inductor L100 when the switching operation is stopped. For example, the power supply circuit 100B includes a diode D104. The diode D104 has the cathode electrically connected to the terminal P2 and the anode grounded. Accordingly, in this embodiment, when the bipolar transistor BT1 is switched from an on-state to an off-state, the energy stored in the inductor L100 is discharged as a current to the output terminal PVo due to the diode D104, and therefore, damage to elements including the switching circuit 120B is prevented.

B: MODIFICATIONS

The embodiments illustrated above can be variously modified. Specific modified modes that are applied to the foregoing embodiments are described below. Two or more of the modes freely selected from the following exemplifications may be combined with one another within a range as long as they do not conflict.

B1: First Modification

Figure 7:
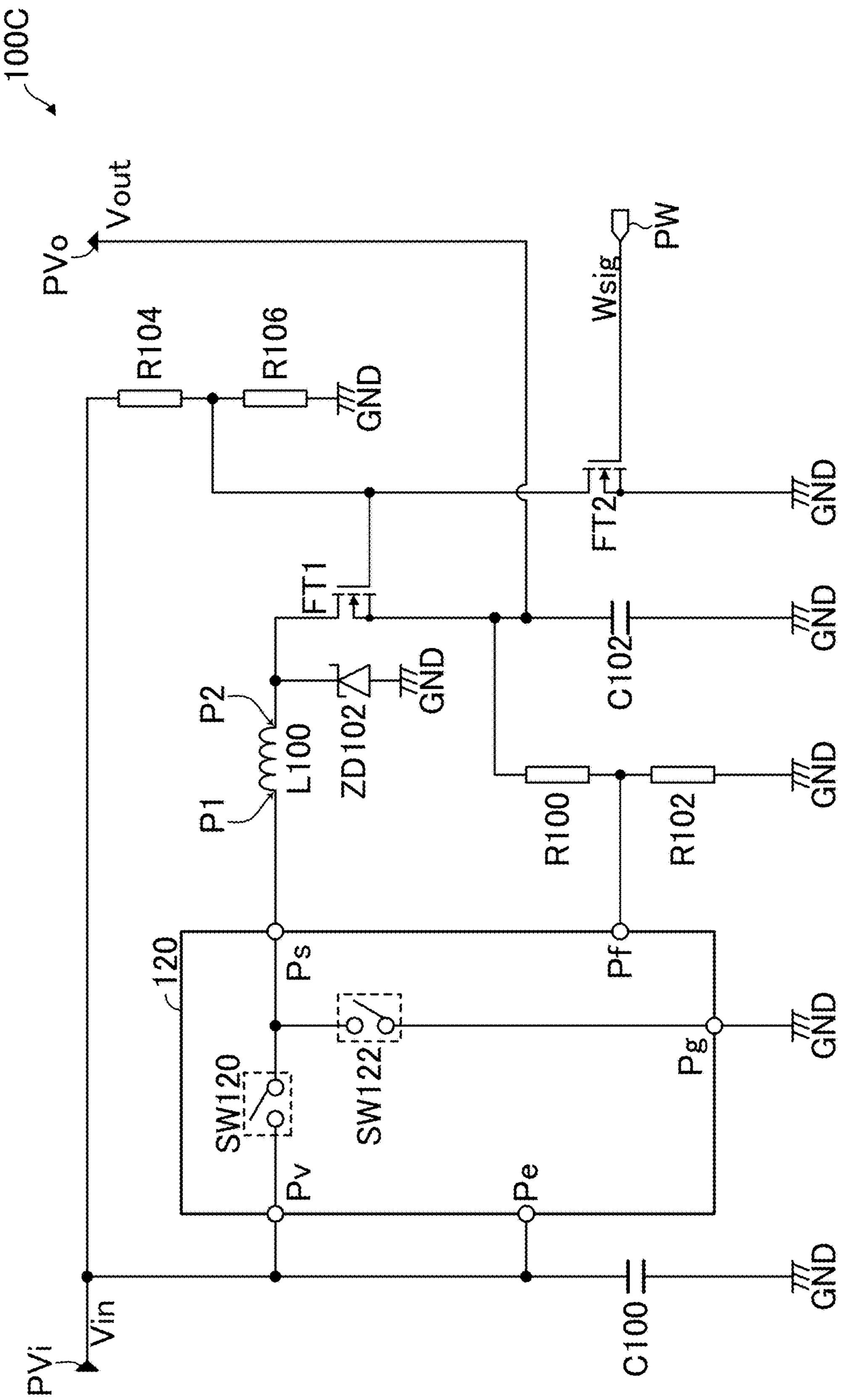
FIG. 7 is an explanatory diagram for an example of a power supply circuit according to a first modification.
Figure 8:
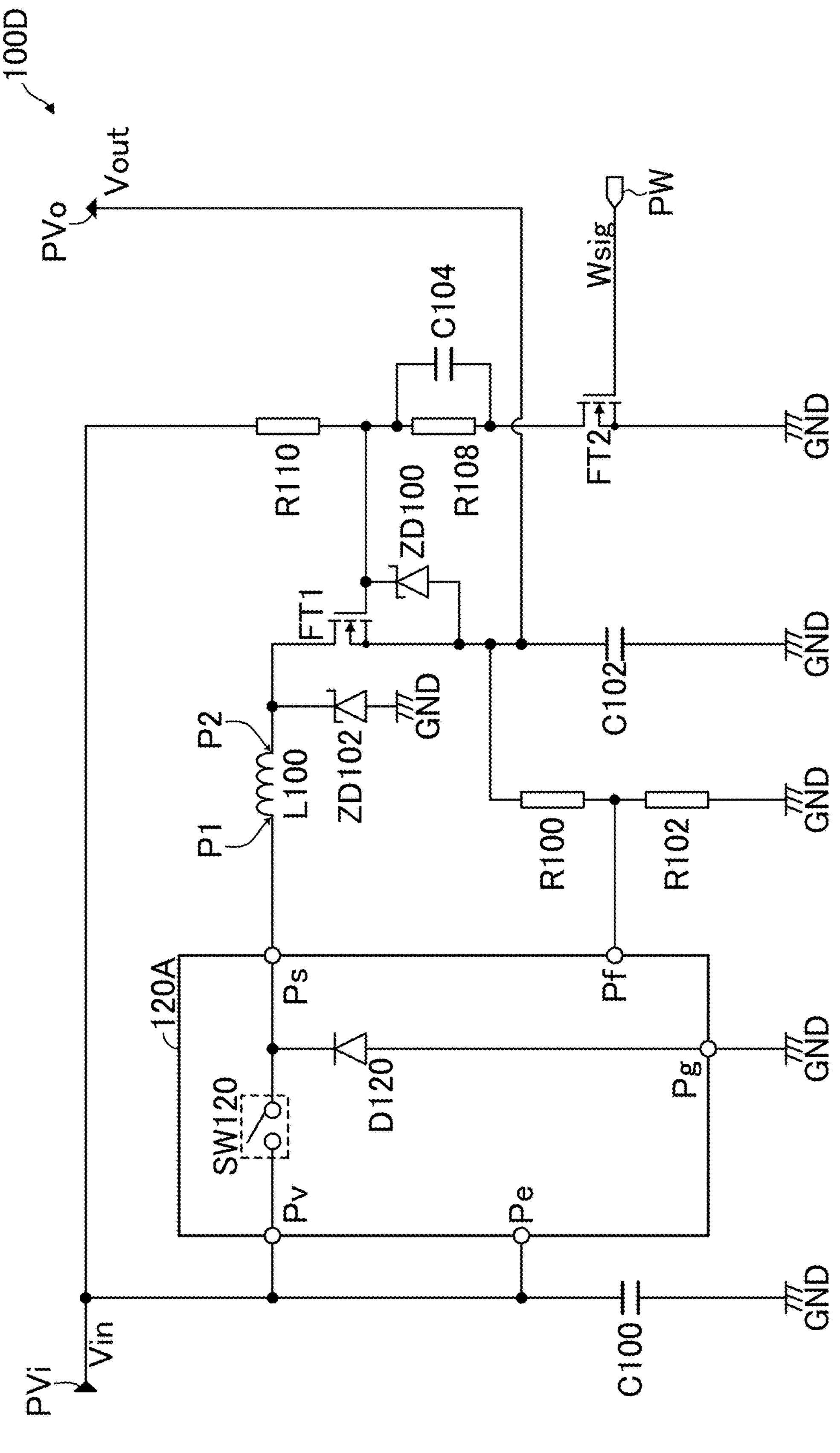
FIG. 8 is an explanatory diagram for an example of another power supply circuit according to the first modification.

In the first and second embodiments, an example is given of the diode D100 that serves as a portion of a path of a current flowing to the inductor L100 when a switching operation is stopped. However, the present invention is not limited thereto. For example, as illustrated in FIG. 7 or 8, the power supply circuit 100 or 100A may include a Zener diode ZD102. The Zener diode ZD102 has a cathode electrically connected to the terminal P2 of the inductor L100 and an anode electrically connected to the ground terminal GND, in place of the diode D100.

FIG. 7 is an explanatory diagram for an example of a power supply circuit 100C according to a first modification. Components substantially the same as those described in FIGS. 1 to 6 are denoted by like reference signs, and detailed explanations thereof are omitted.

The power supply circuit 100C is substantially the same as the power supply circuit 100 illustrated in FIG. 1, except that the power supply circuit 100C includes a Zener diode ZD102 in place of the diode D100 illustrated in FIG. 1. The Zener diode ZD102 is an example of a "diode."

The cathode of the Zener diode ZD102 is electrically connected to the terminal P2 of the inductor L100. The anode of the Zener diode ZD102 is electrically connected to the ground terminal GND. The Zener diode ZD102 acts as a circuit that returns energy stored in the inductor L100 to the ground terminal GND as a current when a current flowing to the inductor L100 is prevented by switching of the transistor FT1 from an on-state to an off-state. By the end of discharge of the energy stored in the inductor L100, the switching operation, which is used to switch between the storing period and the discharge period, is stopped. Even when the switch SW120 is in an on-state, no current flows to the inductor L100. This is because the transistor FT1 is in an off-state and a voltage greater than a breakdown voltage is not applied to the Zener diode ZD102. As a result, the switching operation, which is used to switch the storing period and the discharge period, is stopped. Thus, the Zener diode ZD102 serves as a portion of a path of the current flowing to the inductor L100 until discharge of the energy stored in the inductor L100 ends, when the switching operation is stopped. A preferable example of the Zener diode ZD102 is a Zener diode which has a breakdown voltage greater than the voltage Vin and has a breakdown voltage less than the maximum rating of the voltage across the drain and the source of the transistor FT1.

FIG. 8 is an explanatory diagram for an example of another power supply circuit 100D according to the first modification. Components substantially the same as those described in FIGS. 1 to 7 are denoted by like reference signs and detailed explanations thereof are omitted.

The power supply circuit 100D is substantially the same as the power supply circuit 100A illustrated in FIG. 5, except that the power supply circuit 100D includes a Zener diode ZD102 in place of the diode D100 illustrated in FIG. 5. As to the power supply circuit 100D, similarly to the power supply circuit 100C illustrated in FIG. 7, the cathode of the Zener diode ZD102 is electrically connected to the terminal P2 of the inductor L100. The anode of the Zener diode ZD102 is electrically connected to the ground terminal GND. As described with reference to FIG. 7, the Zener diode ZD102 serves as a portion of a path of the current flowing to the inductor L100 until discharge of energy stored in the inductor L100 ends, when the switching operation is stopped.

In this modification, the power supply circuit 100C or 100D includes the Zener diode ZD102 that is electrically connected to the terminal P2 of the inductor L100 and that serves as a portion of a path of the current flowing to the inductor L100 when the switching operation is stopped. This modification provides substantially the same effects as those in the first and second embodiments.

B2: Second Modification

Figure 9:
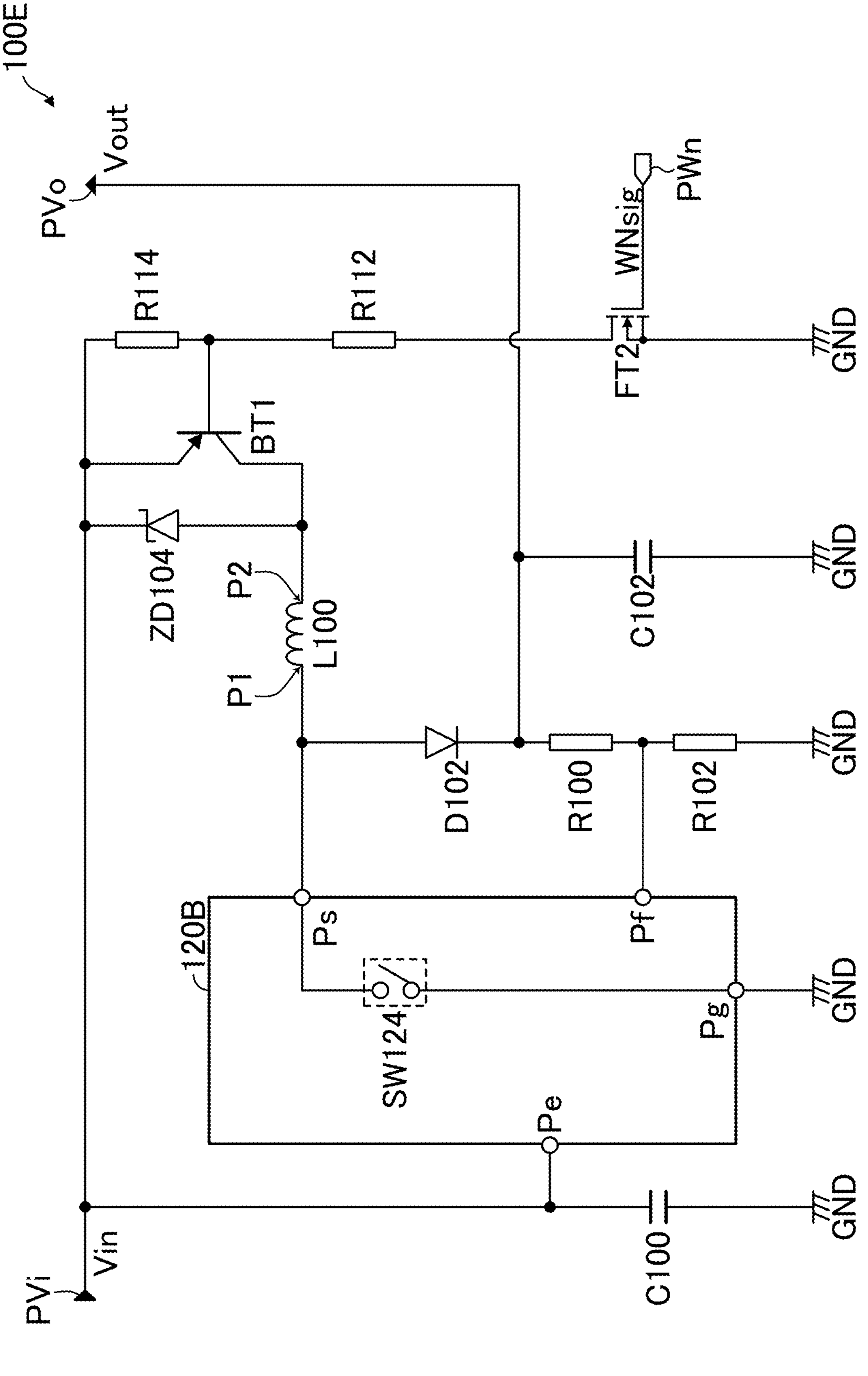
FIG. 9 is an explanatory diagram for an example of a power supply circuit according to a second modification.

In the third embodiment, description of the diode D104 is given as an example of an element that serves as a portion of a path of the current flowing to the inductor L100 when the switching operation is stopped. However, the present invention is not limited thereto. For example, as illustrated in FIG. 9, the power supply circuit 100B may include a Zener diode ZD104. The Zener diode ZD104 may have an anode electrically connected to the terminal P2 of the inductor L100 and a cathode electrically connected to the input terminal PVi in place of the diode D104.

FIG. 9 is an explanatory diagram for an example of a power supply circuit 100E according to a second modification. Components substantially the same as those described in FIGS. 1 to 8 are denoted by like reference signs, and detailed explanations thereof are omitted.

The power supply circuit 100E is substantially the same as the power supply circuit 100B illustrated in FIG. 6, except that the power supply circuit 100E includes the Zener diode ZD104 in place of the diode D104 illustrated in FIG. 6. The Zener diode ZD104 is an example of a "diode."

The cathode of the Zener diode ZD104 is electrically connected to the input terminal PVi. The anode of the Zener diode ZD104 is electrically connected to the terminal P2 of the inductor L100. The Zener diode ZD104 acts as a circuit by which energy stored in the inductor L100 is transferred to the output terminal PVo as a current when a current flowing to the inductor L100 is prevented by switching of the bipolar transistor BT1 from an on-state to an off-state. That is, the Zener diode ZD104 serves as a portion of a path of the current flowing to the inductor L100 until discharge of the energy stored in the inductor L100 ends, when the switching operation is stopped. A preferable example of the Zener diode ZD104 is a Zener diode, which has a breakdown voltage greater than the input voltage Vin and has a breakdown voltage less than the maximum rating of the voltage across the collector and the emitter of the bipolar transistor BT1.

In this modification, the power supply circuit 100E includes the Zener diode ZD104 that is electrically connected to the terminal P2 of the inductor L100 and that serves as a portion of a path of the current flowing to the inductor L100 when the switching operation is stopped. This modification provides substantially the same effects as those in the third embodiment.

B3: Third Modification

Figure 10:
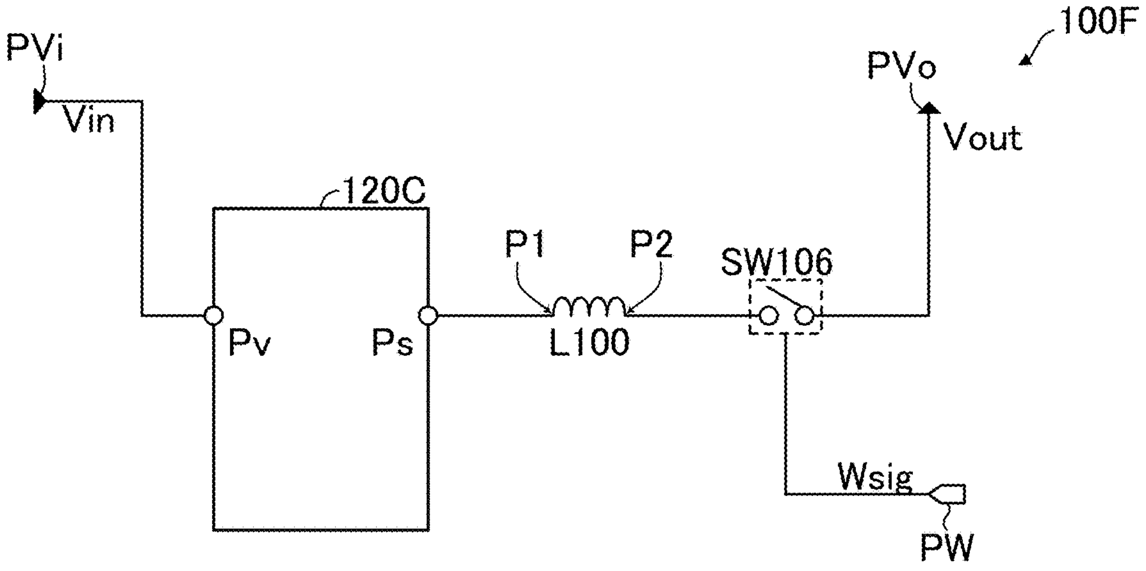
FIG. 10 is an explanatory diagram for an example of a power supply circuit according to a third modification.
Figure 11:
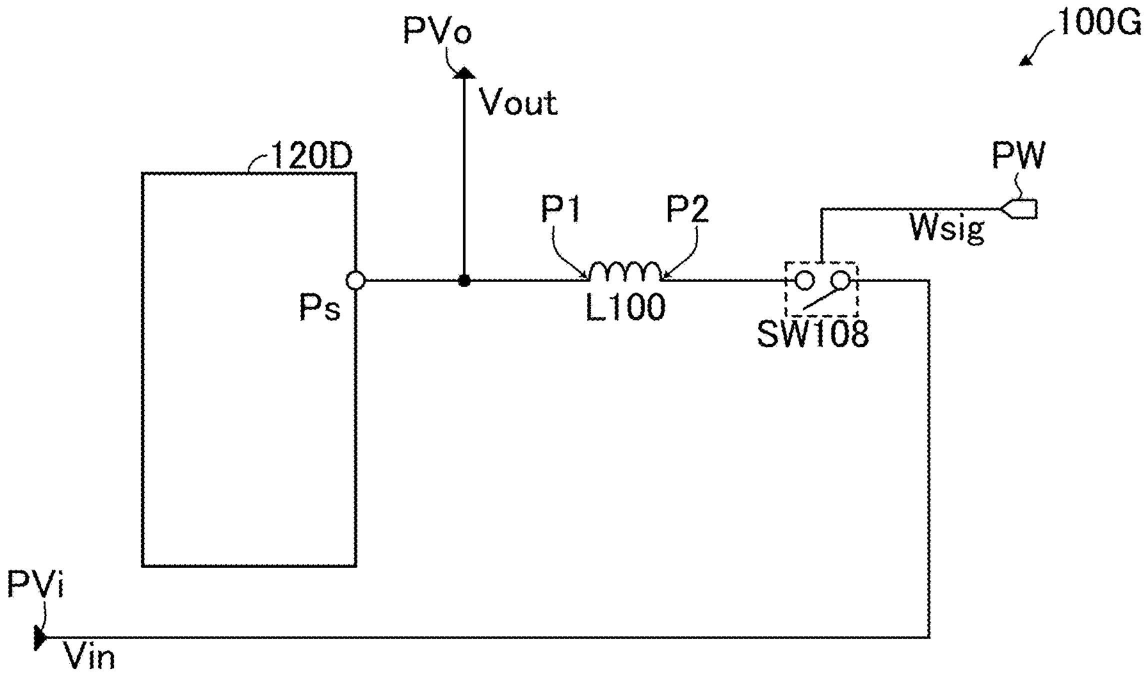
FIG. 11 is an explanatory diagram for an example of another power supply circuit according to the third modification.

It is sufficient for the power supply circuit 100 and other similar devices to include relevant parts illustrated in FIG. 10 or 11.

FIG. 10 is an explanatory diagram for an example of a power supply circuit 100F according to a third modification. Components substantially the same as those described in FIGS. 1 to 9 are denoted by like reference signs, and detailed explanations thereof are omitted.

The power supply circuit 100F is, for example, a step-down switching power supply that outputs the voltage Vout that is less than the input voltage Vin. For example, the power supply circuit 100F includes an input terminal PVi that receives an input voltage Vin, an inductor L100 having the terminal P1 and the terminal P2, a switching circuit 120C, an output terminal PVo, and a switch SW106.

For example, the terminal Ps is electrically connected to the terminal P1 of the inductor L100. The switching circuit 120C switches between a storing period for storing energy in the inductor L100 and a discharge period for discharging the energy stored in the inductor L100. For example, the terminal Pv receives an input voltage Vin from the input terminal PVi. To switch between the storing period and the discharge period, the switching circuit 120C switches between (i) an on-state in which the terminal Pv and the terminal Ps are conductive, and (ii) an off-state in which they are not conductive. Specifically, the switching circuit 120C may include the switches SW120 and SW122, similarly to the switching circuit 120 illustrated in FIG. 1. Alternatively, the switching circuit 120C may include the switch SW120 and the diode D120, similarly to the switching circuit 120A illustrated in FIG. 5.

The terminal P2 of the inductor L100 is connected to the output terminal PVo via the switch SW106. That is, the switch SW106 is electrically connected to the terminal P2 of the inductor L100. The switch SW106 that is in an on-state serves as a portion of a path of a current flowing to the inductor L100 in the storing period and the discharge period.

Switching ON and OFF of the switch SW106 is controlled by the control signal Wsig supplied to the control terminal PW. As the switch SW106, a field effect transistor, a bipolar transistor, or an analog switch may be used.

A current is supplied to the output terminal PVo from the inductor L100 in the storing period and the discharge period. The output terminal PVo outputs the voltage Vout based on the storing period, the discharge period, and the input voltage Vin.

The switch SW106 stops the switching operation, which is used to switch the storing period and the discharge period, by preventing a current flowing to the inductor L100 in the signal processing period TPs. As described with reference to FIG. 3, the signal processing circuit 200 operates by using the voltage Vout output from the output terminal PVo as its power supply voltage. The signal processing period TPs refers to a period in which the signal processing circuit 200 is processing the signal Rsig.

FIG. 11 is an explanatory diagram for an example of another power supply circuit 100G according to the third modification. Components substantially the same as those described in FIGS. 1 to 10 are denoted by like reference signs, and detailed explanations thereof are omitted.

The power supply circuit 100G is, for example, a step-up switching power supply that outputs the voltage Vout greater than the input voltage Vin. For example, the power supply circuit 100G includes an input terminal PVi that receives an input voltage Vin, an inductor L100 having the terminal P1 and the terminal P2, a switching circuit 120D, an output terminal PVo, and a switch SW108.

For example, the terminal Ps is electrically connected to the terminal P1 of the inductor L100. The switching circuit 120D switches between a storing period for storing energy in the inductor L100 and a discharge period for discharging the energy stored in the inductor L10. For example, to switch between the storing period and the discharge period, the switching circuit 120D switches (i) an on-state in which the ground terminal GND and the terminal Ps are conductive and (ii) an off-state in which they are not conductive. Specifically, the switching circuit 120D may include the switch SW124, similarly to the switching circuit 120B illustrated in FIG. 6.

The terminal P2 of the inductor L100 is connected to the input terminal PVi via the switch SW108. That is, the switch SW108 is electrically connected to the terminal P2 of the inductor L100. The switch SW108 that is in an on-state serves as a portion of a path of a current flowing to the inductor L100 in the storing period and the discharge period. Switching ON and OFF of the switch SW108 is controlled by the control signal Wsig supplied to the control terminal PW. As the switch SW108, a field effect transistor, a bipolar transistor, or an analog switch may be used, for example.

The output terminal PVo is electrically connected to the terminal P1 of the inductor L100 and outputs the voltage Vout based on the storing period, the discharge period, and the input voltage Vin. A current is supplied to the output terminal PVo from the inductor L100 in the discharge period of the storing period and the discharge period.

The switch SW108 stops a switching operation, which is used to switch the storing period and the discharge period, by preventing a current flowing to the inductor L100 in the signal processing period TPs.

This modification provides substantially the same effects as those in the foregoing embodiments and modifications.

B4: Fourth Modification

In the foregoing embodiments and modifications, an example is given of the device 10 as an ultrasonic flowmeter. However, the present invention is not limited thereto. For example, the device 10 may be an analyzer, such as a gas analyzer. The sensor 300 is also not limited to a sensor using ultrasonic waves. For example, the sensor 300 may be a sensor using infrared light, or it may be a sensor that detects concentration of gas, such as oxygen. In the foregoing embodiments and modifications, a case is given in which the signal processing circuit 200 is a "predetermined circuit." However, the "predetermined circuit" is not limited to the signal processing circuit 200. For example, the predetermined circuit may be a circuit that receives power supply voltage from a power supply circuit other than the power supply circuit 100. This modification provides substantially the same effects as those in the foregoing embodiments and modifications.

C: EXAMPLE OF USE

If the time from stopping an operation of the switching circuit 120 until resuming the operation is within an acceptable time, the operation of the switching circuit 120 may be stopped in order to stop the switching operation. Similarly, the operation of the switching circuit 120A or 120B may be stopped in order to stop the switching operation.

Figure 12:
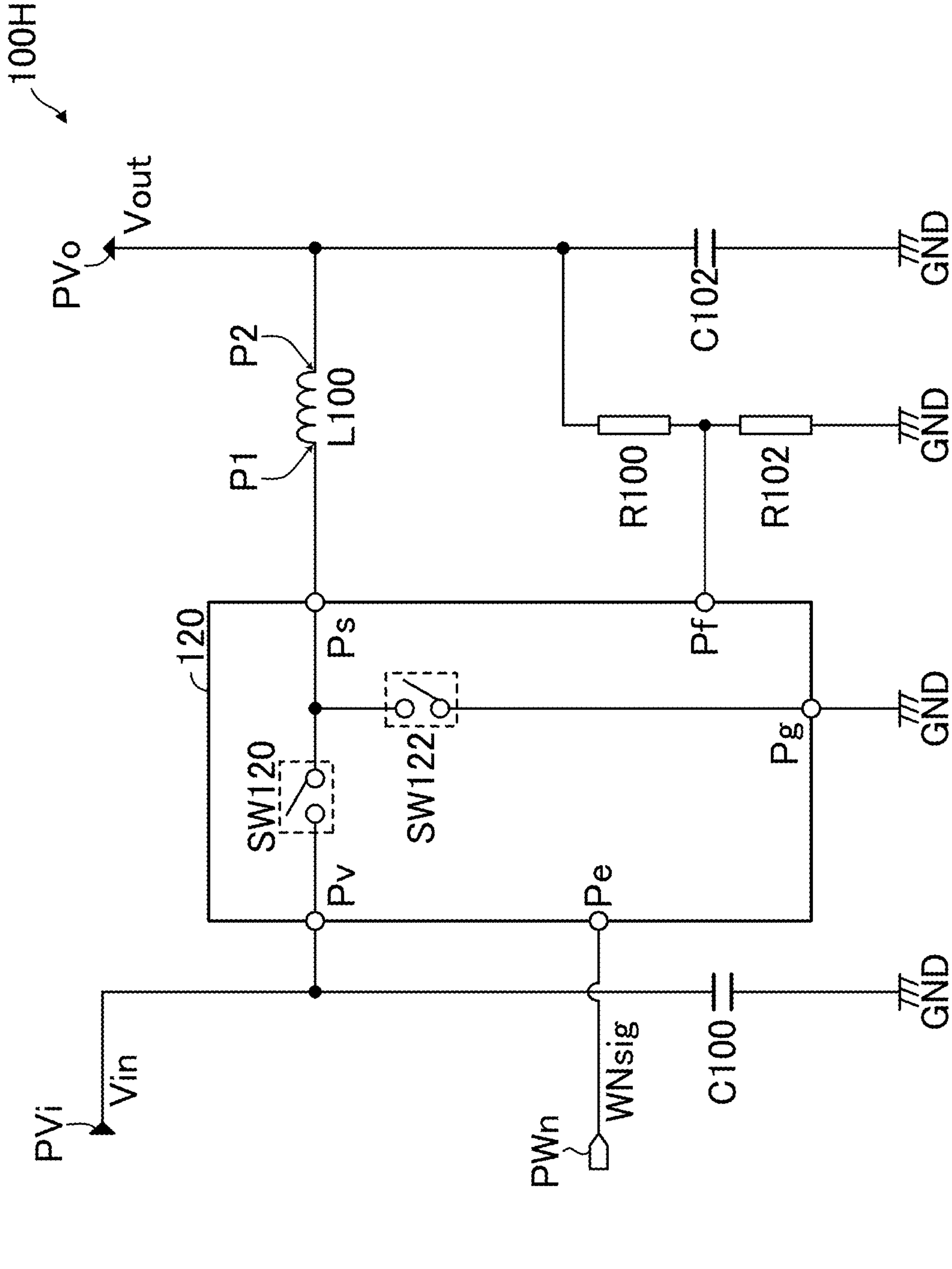
FIG. 12 is an explanatory diagram for an example of a power supply circuit according to an example of use.

FIG. 12 is an explanatory diagram for an example of a power supply circuit 100H according to an example of use. Components substantially the same as those described in FIGS. 1 to 11 are denoted by like reference signs and detailed explanations thereof are omitted.

The power supply circuit 100H is substantially the same as the power supply circuit 100 except that the following (i) and (ii): (i) the transistors FT1 and FT2, the resistors R104 and R106, and the diode D100 illustrated in FIG. 1 are omitted from the power supply circuit 100, and (ii) the terminal to which the terminal Pe of the switching circuit 120 is connected is different. For example, the terminal Pe of the switching circuit 120 is connected to the control terminal PWn that receives a control signal WNsig. The polarity of the control terminal PWn is opposite to the polarity of the control signal Wsig illustrated in FIG. 3.

For example, the control signal WNsig is maintained at a low level in the period TPw illustrated in FIG. 3. The control signal WNsig is maintained at a high level in a period other than the period TPw. Since the operation of the switching circuit 120A is stopped in the period TPw for a low-level control signal WNsig, the switching operation, which is used to switch the storing period and the discharge period, is stopped. As a result, in this example of use, it is possible to prevent generation of switching noise in the signal processing period TPs included in the period TPw.

The power supply circuit 100H may include the switching circuit 120A illustrated in FIG. 5 in place of the switching circuit 120. Alternatively, the power supply circuit 100H may be a step-up power supply circuit. In an example of the power supply circuit 100H, the bipolar transistor BT1, the transistor FT2, the resistors R112 and R114, and the diode D104 illustrated in FIG. 6 are omitted from the power supply circuit 100B. In this case, the terminal P2 of the inductor L100 is connected to the input terminal PVi.

Thus, in this example of use, the power supply circuit 100H includes an input terminal PVi that receives an input voltage Vin, an inductor L100 including terminals P1 and P2, a switching circuit 120 that is electrically connected to the terminal P1 and switches between a storing period for storing energy stored in the inductor L100 and a discharge period for discharging the energy stored in the inductor L100, and an output terminal PVo that receives a current from the inductor L100 at least in the discharge period from among the storing period and the discharge period.

The output terminal PVo outputs the voltage Vout based on the storing period, the discharge period, and the input voltage Vin.

A signal processing circuit 200 is provided which operates by using the voltage Vout output from the output terminal PVo as its power supply voltage. The signal processing circuit 200 is processing the signal Rsig in a signal processing period TPs. In the signal processing period TPs, the switching circuit 120 stops a switching operation. That is, the power supply circuit 100H is controlled in such a manner that the switching operation is stopped in the signal processing period TPs. Accordingly, in this example of use, similarly to the foregoing embodiments and modifications, it is possible to prevent generation of switching noise caused by the switching operation in the signal processing period TPs.

DESCRIPTION OF REFERENCE SIGNS

10, 10Z . . . device, 100, 100A, 100B, 100C, 100D, 100E, 100F, 100G, 100H, 100Z . . . power supply circuit, 120, 120A, 120B, 120C, 120D . . . switching circuit, 200 . . . signal processing circuit, 220 . . . controller, 240*a*, 240*b* . . . switch, 260 . . . transmitter, 262 . . . receiver, 280 . . . time measurement part, 282 . . . flow-rate calculator, 300 . . . sensor, 320*a*, 320*b* . . . ultrasound probe, 322*a*, 322*b* . . . ultrasonic vibrator, 324*a*, 324*b* . . . wedge, BT1 . . . bipolar transistor, C100, C102, C104 . . . capacitor, D100, D102, D104, D120 . . . diode, FL . . . fluid, FT1, FT2 . . . transistor, L100 . . . inductor, PB . . . printed circuit board, PL . . . pipe, PVi . . . input terminal, PVo . . . output terminal, R100, R102, R104, R106, R108, R110, R112, R114 . . . resistor, SLD . . . shield member, SW120, SW122, SW124 . . . switch, TPs . . . signal processing period, ZD100, ZD102, ZD104 . . . . Zener diode.

What is claimed is:

1. A power supply circuit comprising:

an input terminal that receives an input voltage;

an inductor including a first terminal and a second terminal;

a switching circuit electrically connected to the first terminal and configured to switch between a first period for storing energy in the inductor and a second period for discharging the energy stored in the inductor;

an output terminal that receives a current from the inductor at least in the second period from among the first period and the second period; and a first element electrically connected to the second terminal and serving as a portion of a path of the current flowing to the inductor in the first period and the second period, wherein:

the output terminal outputs a voltage based on the first period, the second period, and the input voltage, and the first element stops a switching operation that is used to switch between the first period and the second period, by preventing the current flowing to the inductor, in a predetermined period in which a predetermined circuit is processing a predetermined signal, wherein the switching circuit brings the ground terminal and the first terminal into one of a conductive state and a nonconductive state, and the first element brings the second terminal and the input terminal into one of a conductive state and a nonconductive state.

2. The power supply circuit according to claim 1, wherein:

the switching circuit brings the input terminal and the first terminal into a conductive state in the first period, the switching circuit brings the input terminal and the first terminal into a nonconductive state in the second period, the first element brings the second terminal and the output terminal into a conductive state in the first period and the second period, and the first element brings the second terminal and the output terminal into a nonconductive state in the predetermined period.

3. The power supply circuit according to claim 2, further comprising a diode electrically connected to the second terminal and serving as a portion of a path of a current flowing to the inductor when the switching operation is stopped.

4. The power supply circuit according to claim 2, further comprising a voltage control element including a third terminal and a fourth terminal and configured to operate in such a manner that a first voltage at the third terminal relative to a second voltage at the fourth terminal does not exceed a predetermined voltage, wherein:

the first element is a field effect transistor, the third terminal is connected to a gate of the field effect transistor, and the fourth terminal is connected to a source of the field effect transistor.

5. A power supply circuit comprising:

an input terminal that receives an input voltage;

an inductor including a first terminal and a second terminal;

a switching circuit electrically connected to the first terminal and configured to switch between a first period for storing energy in the inductor and a second period for discharging the energy stored in the inductor;

an output terminal that receives a current from the inductor at least in the second period from among the first period and the second period; and a first element electrically connected to the second terminal and serving as a portion of a path of the current flowing to the inductor in the first period and the second period, wherein:

the output terminal outputs a voltage based on the first period, the second period, and the input voltage, and the first element stops a switching operation that is used to switch between the first period and the second period, by preventing the current flowing to the inductor, in a predetermined period in which a predetermined circuit is processing a predetermined signal, wherein:

the switching circuit brings a ground terminal that receives a ground voltage and the first terminal into a conductive state in the first period, the switching circuit brings the ground terminal and the first terminal into a nonconductive state in the second period, the first element brings the second terminal and the input terminal into a conductive state in the first period and the second period, and the first element brings the second terminal and the input terminal into a nonconductive state in the predetermined period.

6. The power supply circuit according to claim 5, further comprising a diode electrically connected to the second terminal and serving as a portion of a path of a current flowing to the inductor when the switching operation is stopped.

7. A device comprising:

a power supply circuit;

a sensor; and a predetermined circuit, wherein the power supply circuit comprises:

an input terminal that receives an input voltage;

an inductor including a first terminal and a second terminal;

a switching circuit electrically connected to the first terminal and configured to switch between a first period for storing energy in the inductor and a second period for discharging the energy stored in the inductor;

an output terminal that receives a current from the inductor at least in the second period from among the first period and the second period; and a first element electrically connected to the second terminal and serving as a portion of a path of a current flowing to the inductor in the first period and the second period, wherein:

the output terminal outputs a voltage based on the first period, the second period, and the input voltage, the first element stops a switching operation that is used to switch between the first period and the second period, by preventing the current flowing to the inductor, in a predetermined period in which the predetermined circuit is processing a predetermined signal, and the predetermined circuit processes an output signal of the sensor as the predetermined signal, wherein the switching circuit brings the ground terminal and the first terminal into one of a conductive state and a nonconductive state, and the first element brings the second terminal and the input terminal into one of a conductive state and a nonconductive state.

* * * * *